(12) United States Patent
Kroell

(10) Patent No.: US 9,890,929 B2
(45) Date of Patent: Feb. 13, 2018

(54) POLYHEDRON, ROTATIONAL ARRANGEMENTS, LIGHT SOURCE ARRANGEMENTS, A LIGHT SOURCE DEVICE, A LIGHTING DEVICE, A THREE-DIMENSIONAL BODY AND PROJECTORS

(75) Inventor: Josef Kroell, Potsdam (DE)

(73) Assignee: OSRAM GmbH, Munich (DE)

( * ) Notice: Subject to any disclaimer, the term of this patent is extended or adjusted under 35 U.S.C. 154(b) by 1121 days.

(21) Appl. No.: 13/578,816

(22) PCT Filed: Jun. 22, 2010

(86) PCT No.: PCT/EP2010/058834
§ 371 (c)(1),
(2), (4) Date: Aug. 14, 2012

(87) PCT Pub. No.: WO2011/160680
PCT Pub. Date: Dec. 29, 2011

(65) Prior Publication Data
US 2013/0088850 A1    Apr. 11, 2013

(51) Int. Cl.
| | |
|---|---|
| F21V 9/10 | (2006.01) |
| G02B 5/09 | (2006.01) |
| G02B 26/00 | (2006.01) |
| G02B 26/12 | (2006.01) |
| G02B 27/09 | (2006.01) |
| G03B 21/20 | (2006.01) |
| H04N 9/31 | (2006.01) |
| F21K 2/00 | (2006.01) |
| F21V 7/00 | (2006.01) |
| F21V 9/00 | (2018.01) |

(52) U.S. Cl.
CPC ............ *F21V 9/10* (2013.01); *F21K 2/00* (2013.01); *F21V 7/00* (2013.01); *F21V 9/00* (2013.01); *G02B 5/09* (2013.01); *G02B 26/008* (2013.01); *G02B 26/12* (2013.01); *G02B 27/0933* (2013.01); *G03B 21/204* (2013.01); *G03B 21/2013* (2013.01); *H04N 9/315* (2013.01)

(58) Field of Classification Search
CPC ................ F21K 2/00; F21V 7/00; F21V 9/00
USPC .......... 362/84, 235, 282, 317, 341; 313/483
See application file for complete search history.

(56) References Cited

U.S. PATENT DOCUMENTS

| | | | | |
|---|---|---|---|---|
| 4,131,064 | A * | 12/1978 | Ryan et al. ................... | 102/293 |
| 4,298,911 | A * | 11/1981 | Headrick ............... | F21S 10/06 |
| | | | | 362/249.01 |
| 4,899,175 | A * | 2/1990 | Harada .................... | B41J 2/465 |
| | | | | 347/232 |

(Continued)

FOREIGN PATENT DOCUMENTS

| | | |
|---|---|---|
| CN | 1506712 A | 6/2004 |
| DE | 202005015013 U1 | 5/2006 |

(Continued)

OTHER PUBLICATIONS

Office Action issued in the parallel Chinese application 201080067604.8 dated Nov. 3, 2014.
English Abstract for DE 202005015013 U1. May 4, 2006.

*Primary Examiner* — Andrew Coughlin
(74) *Attorney, Agent, or Firm* — Viering, Jentschura & Partner mbB

(57) ABSTRACT

According to an embodiment, a polyhedron may be provided. The polyhedron may include a first luminescent face; and a second luminescent face.

8 Claims, 23 Drawing Sheets

(56) References Cited

U.S. PATENT DOCUMENTS

| | | | |
|---|---|---|---|
| 4,955,975 A | | 9/1990 | Mori |
| 4,979,030 A | * | 12/1990 | Murata ................ H04N 9/3129 348/196 |
| 5,034,658 A | | 7/1991 | Hiering et al. |
| 5,408,389 A | | 4/1995 | Burlingame |
| 5,491,578 A | * | 2/1996 | Harris .................. G02B 26/129 359/208.1 |
| 6,078,380 A | * | 6/2000 | Taniguchi ............... G03B 27/68 355/52 |
| 6,220,727 B1 | | 4/2001 | Chang |
| 2006/0098428 A1 | * | 5/2006 | Rosserot ................ F24C 7/004 362/227 |
| 2006/0227087 A1 | * | 10/2006 | Hajjar ...................... G09G 3/02 345/84 |
| 2009/0059207 A1 | | 3/2009 | Nierin et al. |
| 2009/0284148 A1 | | 11/2009 | Iwanaga |

FOREIGN PATENT DOCUMENTS

| | | | |
|---|---|---|---|
| EP | 0291475 A2 | | 11/1988 |
| GB | 2435090 A | | 8/2007 |
| JP | 2003-16977 | * | 1/2003 |
| WO | 9708059 A1 | | 3/1997 |

* cited by examiner

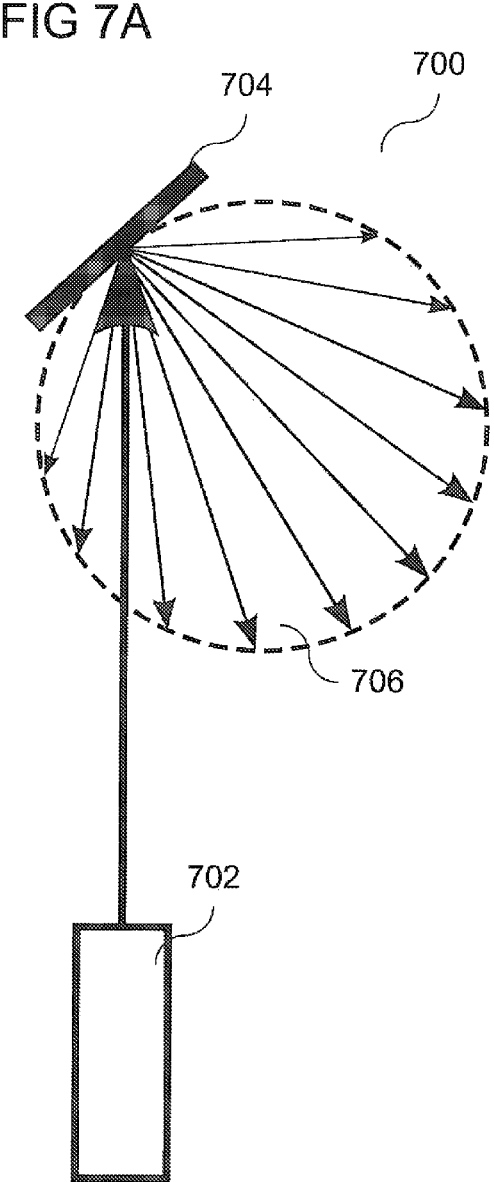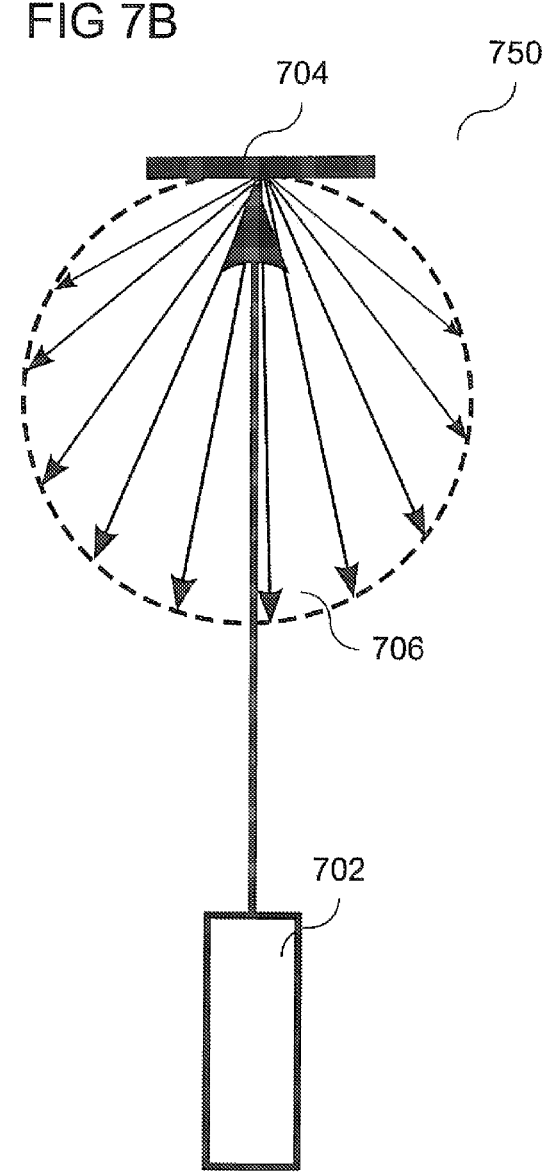

POLYHEDRON, ROTATIONAL ARRANGEMENTS, LIGHT SOURCE ARRANGEMENTS, A LIGHT SOURCE DEVICE, A LIGHTING DEVICE, A THREE-DIMENSIONAL BODY AND PROJECTORS

RELATED APPLICATIONS

The present application is a national stage entry according to 35 U.S.C. § 371 of PCT application No.: PCT/EP2010/058834 filed on Jun. 22, 2010.

TECHNICAL FIELD

Embodiments relate generally to polyhedrons, rotational arrangements, light source arrangements, light source devices, lighting devices, a three-dimensional body and projectors.

BACKGROUND

In various scenarios, like for example illumination of small areas (for example for displaying of pixels for displaying information) or large areas (for example for illuminating a wall with effects for the spectators' amusement), conversion of light from one color to another color may be desired.

US2009284148 A1 discloses a projector which uses a light source unit that has a plurality of fan-shaped segment areas on a circular transparent base material which can be controlled to rotate. Layers of different phosphors which emit light of predetermined wavelength bands by receiving excitation light from an excitation light source are disposed on at least two of the segment areas on the transparent base material.

SUMMARY

According to an embodiment, a polyhedron may be provided. The polyhedron may include a first luminescent face; and a second luminescent face.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 7A and 7B show illustrations of Lambert's cosine law;

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

According to various embodiments, light may be understood as visible light or as invisible light (for example as ultra violet (UV) light).

According to various embodiments, "laser" may be understood as laser light. According to various embodiments, "laser" may also be understood as the device that generates the laser light.

Figure 1:
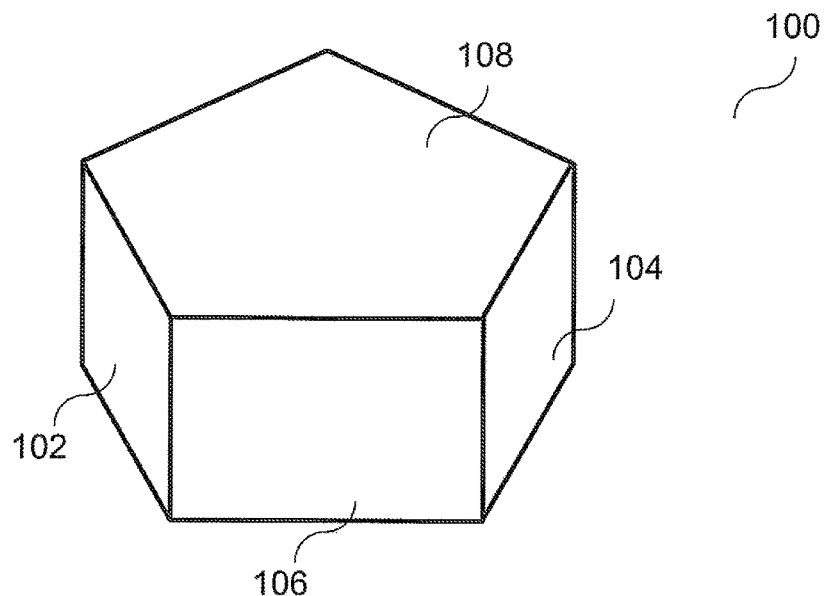
FIG. 1 shows a polyhedron in accordance with an embodiment.

FIG. 1 shows a polyhedron 100 in accordance with an embodiment. The polyhedron may include a first luminescent face 102 and a second luminescent face 104. Although further faces (a third face 106 and a fourth face 108) are shown in FIG. 1, the polyhedron 100 may include any number of faces, and each of the faces besides the first luminescent face 102 and the second luminescent face 104 may be luminescent, but does not have to be luminescent.

The luminescent faces of the polyhedron 100 may allow that light of different color may be emitted from the respective luminescent face, when the respective luminescent face is excited, for example by means of light or radiation, as will be explained in more detail below.

In various embodiments, each face of the polyhedron 100 may include (or may be) a luminescent face.

In various embodiments, at least one of the first luminescent face 102 and the second luminescent face may include a reflective surface.

For example, a reflective surface may be provided on the first luminescent face 102 or the second luminescent face 104 under a luminescent coating. By this reflective surface, light emitted from the luminescent coating may be reflected, so that all light emitted from the luminescent coating may be radiated to the outer side of the polyhedron 100.

In various embodiments, at least one of the first luminescent face 102 and the second luminescent face 104 may include at least one type of the following types of faces: an electroluminescent face; a cathodoluminescent face, a photoluminescent face; a fluorescent face; a phosphorescent face; a thermoluminescent face; a radioluminescent face; and an ionoluminescent face.

In various embodiments, at least one luminescent face (for example the first luminescent face 102, the second luminescent face 104, or any other one of the luminescent faces of the polyhedron 100) may be configured to be luminescent in a pre-determined color.

In various embodiments, any two luminescent faces may be configured to be luminescent in different colors.

In various embodiments, at least one luminescent face may be configured to be luminescent in a pre-determined plurality of colors.

In various embodiments, at least one luminescent face may be configured to be luminescent in a color gradient.

In various embodiments, at least one luminescent face may be configured to be luminescent in color segments of different colors.

In various embodiments, a first optical element may be fixed to the first luminescent face 102.

The first optical element may be configured so that in case the polyhedron 100 is rotated and illuminated from a fixed position, the direction of the light emitted from the first luminescent face is also rotating.

In various embodiments, the first optical element may be a first lens, for example a cylinder lens, for example a stripe-shaped cylinder lens.

In various embodiments, a second optical element may be fixed to the second face.

In various embodiments, the second optical element may be a second lens, for example a cylinder lens, for example a stripe-shaped cylinder lens.

Figure 2:
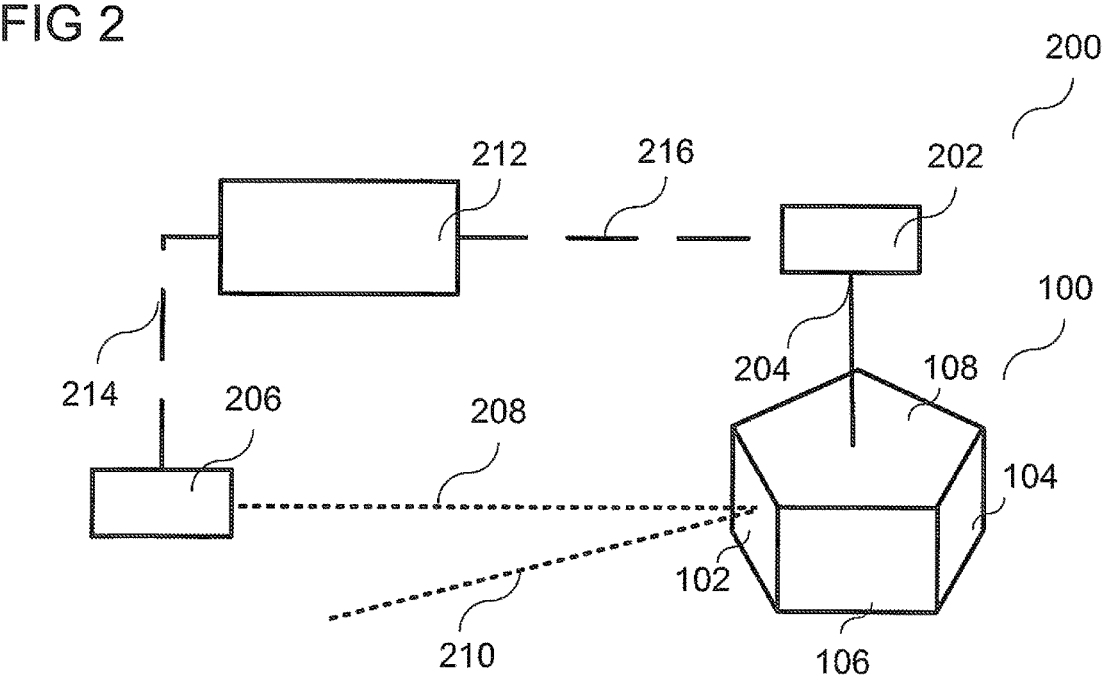
FIG. 2 shows a light source arrangement in accordance with an embodiment.

FIG. 2 shows a light source arrangement 200 in accordance with an embodiment. The light source arrangement 200 may include a primary light source 206 and a secondary light source. The primary light source 206 may be configured to illuminate the secondary light source. The secondary light source may include a polyhedron 100 as described above.

In various embodiments, the light source arrangement 200 may further include a driving mechanism 202 fixed to at least one of the primary light source and the secondary light source.

For example, as shown in FIG. 2, the driving mechanism 202 may be fixed to the polyhedron 100, and may for example rotate the polyhedron 100.

By rotating the polyhedron 100, different luminescent faces may be illuminated by the primary light source 206 at different times. Furthermore, in case the primary light source 206 is switched on and off in a way synchronized with the driving mechanism 202, only one or more pre-determined luminescent faces of the polyhedron 100 may be illuminated, in other words, the primary light source 206 may be switched on, when the driving mechanism 202 rotates the polyhedron in a way that one of the pre-determined luminescent faces may be illuminated by the primary light source 206, and the primary light source 206 may be switched off, when the driving mechanism 202 rotates the polyhedron 100 in a way that a face different from the pre-determined luminescent faces would be illuminated by the primary light source 206 in case the primary light source 206 would not be switched off.

In various embodiments, instead of being switched on and off, the intensity of the primary light source may be changed.

In various embodiments, the driving mechanism 202 may be fixed to the polyhedron by an axis 204.

In various embodiments, the driving mechanism 202 may include a joint.

In various embodiments, the driving mechanism 202 may include an actuator.

In various embodiments, the actuator may include an electric actuator.

In various embodiments, the primary light source 206 may include at least one of a laser and a light-emitting diode.

In various embodiments, the primary light source 206 may include at least one of a plurality of lasers and a plurality of light-emitting diodes.

In various embodiments, the primary light source 206 may include a laser configured to scan over at least a part of the surface of the secondary light source. For example, the laser may not be directed to a fixed point on the secondary light source, but may be configured to illuminate an area (for example a circle, or a rectangle) on the surface of the second light source, by being moved accordingly.

In various embodiments, the secondary light source may be configured to emit light of a lower energy than the energy of the light of the primary light source 206. For example, the primary light source 206 may emit radiation or light 208 of a fixed wavelength or spectrum, and the light 210 emitted from the second light source after excitation by radiation or light from the primary light source 206, may be of lower energy that the radiation or light of the primary light source 206.

In various embodiments, the light source arrangement 200 may further include a controller 212 configured to control the primary light source 206 and the driving mechanism 202, so that the primary light source 206 is switched between an on state and an off state based on the state of the driving mechanism 202. For example, the controller 212 may control the primary light source 206 and the driving mechanism 202 so that only one or more pre-determined luminescent faces of the polyhedron may be illuminated, as described above.

In various embodiments, instead of being switched on and off, the intensity of the primary light source 206 may be changed.

The controller 212 and the primary light source 206 may be coupled with each other, e.g. via an electrical connection 214 such as e.g. a cable or a computer bus or via any other suitable electrical connection to exchange electrical signals.

The controller 212 and the driving mechanism 202 may be coupled with each other, e.g. via an electrical connection 216 such as e.g. a cable or a computer bus or via any other suitable electrical connection to exchange electrical signals.

In various embodiments, the light source arrangement 200 may further include a cooling device (not shown) configured to cool the secondary light source.

In various embodiments, the cooling device may be an internal cooling device.

In various embodiments, the cooling device may include at least one of a water cooler, a radiator, an air cooler, a heat exchanger, a turbine blade, warped air holes, ventilator rotors and a heatpipe, and the like.

In various embodiments, the light source arrangement 200 may further include a fixed optical element (not shown). In various embodiments, fixed may be understood as not driven by the driving mechanism 202.

In various embodiments, the fixed optical element may be arranged to be passed by light from the secondary light source. The fixed optical element may mix and homogenize the light 201 emitted from the secondary light source.

In various embodiments, the light source arrangement 200 may further include a mirror, (not shown) arranged between the primary light source 206 and the secondary light source.

In various embodiments, the mirror may include (or have) a hole.

In various embodiments, the mirror may be a dichroic mirror.

By use of a mirror arranged between the primary light source 206 and the secondary light source, light emitted from the secondary light source may be directed into another direction, while, with the use of a mirror with a hole or a dichroic mirror, the secondary light source may be illuminated by the primary light source 206.

In various embodiments, the light source arrangement 200 may include a plurality of primary light sources configured to illuminate the secondary light source. By use of a plurality of primary light sources, a larger area may be illuminated on the secondary light source, and the area may be illuminated from different angles, allowing increased flexibility in the light arrangement of the light emitted from the secondary light source.

In various embodiments, the polyhedron 100 may include a plurality of optical elements, each fixed to a face of the polyhedron.

In various embodiments, each primary light source of the plurality of primary light sources may be configured to illuminate at most one optical element of the plurality of optical elements at a time. By way of example, when a plurality of primary light sources illuminates that polyhedron, a plurality of optical elements fixed on the face of the polyhedron may be provided, similar to the case of one optical element on one face for one primary light source.

In various embodiments, the polyhedron 100 may be configured so that the primary light source 206 may illuminate a plurality of luminescent faces of the polyhedron at a time, as will be explained in more detail below.

In various embodiments, the polyhedron 100 may be configured so that the primary light source 206 may illuminate a plurality of luminescent faces of the same color of the polyhedron at a time, as will be explained in more detail below.

In various embodiments, the polyhedron 100 may be configured so that the primary light source 206 may illuminate a plurality of luminescent faces of different colors of the polyhedron at a time, as will be explained below.

In various embodiments, a projector may include a light source arrangement according to one of the above described embodiments. The projector may be a data projector, a video projector, or a wallwasher, as will be explained below. In general, the projector may be any optical device being configured to project light to a projection surface being located outside the optical device.

Figure 3A:
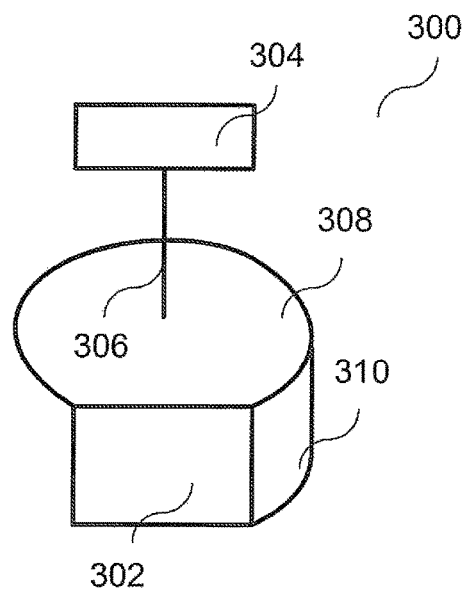
FIGS. 3A and 3B show a rotational arrangement in accordance with an embodiment.
Figure 3B:
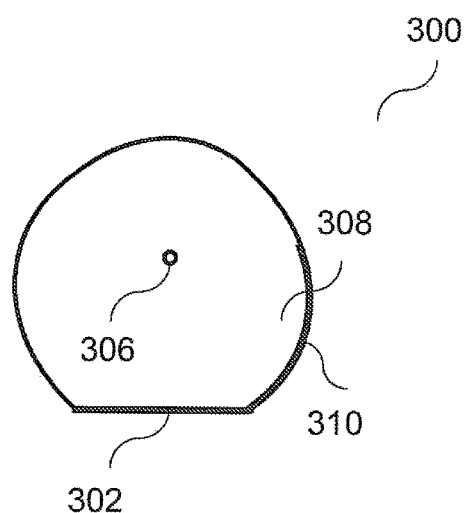

FIGS. 3A and 3B show a rotational arrangement 300 in accordance with an embodiment. FIG. 3A shows a perspective view of the rotational arrangement 300, and FIG. 3B shows a top view of the rotational arrangement. The rotational arrangement 300 may include a luminescent plane 302, and a driving mechanism 304 fixed to the luminescent plane 302. The driving mechanism 304 may include an axis of rotation, wherein the angle between the axis of rotation and the luminescent plane 302 may be an acute angle.

Various features and effects of the rotational arrangement 300 may be the same or similar to the polyhedron 100 described with reference to FIG. 1 or the light source arrangement 200 described with reference to FIG. 2, and duplicate description thereof may be omitted for sake of brevity.

In various embodiments, the driving mechanism 304 may be fixed to the luminescent plane 302 by means of a rod 306 and an additional plane 308.

In various embodiments, the driving mechanism 304 may include a joint.

In various embodiments, the driving mechanism 304 may include an actuator.

In various embodiments, the driving mechanism 304 may include an electric actuator.

In various embodiments, the rotational arrangement 300 may further include a plurality of luminescent planes (not shown). In various embodiments, an edge may be provided between at least two luminescent planes of the plurality of luminescent planes.

In various embodiments, the rotational arrangement 300 may further include a polyhedron (not shown), wherein a first luminescent face of the polyhedron may include (or may be) the luminescent plane 302.

In various embodiments, the rotational arrangement 300 may further include a curved luminescent surface 310.

In various embodiments, an acute angle may be understood as an angle lower than 90 degrees.

In various embodiments, the acute angle may be an angle lower than 5 degrees.

In various embodiments, the acute angle may be equal to or substantially equal to 0.

In various embodiments, the axis of rotation and the normal of the luminescent plane may be perpendicular.

In various embodiments, the axis of rotation and the normal of the luminescent plane may be substantially perpendicular.

In various embodiments, at least one of the luminescent plane 302 and the curved luminescent surface 310 may include a reflective surface.

In various embodiments, at least one of the luminescent plane 302 and the curved surface 310 may include an electroluminescent surface; a cathodoluminescent surface, a photoluminescent surface; a fluorescent surface; a phosphorescent surface; a thermoluminescent surface; a radioluminescent surface; and/or an ionoluminescent surface.

In various embodiments, at least one luminescent surface (for example the luminescent plane 302 or the curved luminescent surface 310) may be configured to be luminescent in a pre-determined color.

In various embodiments, at least two of the plurality of luminescent planes (including the luminescent plane 302) and the curved luminescent surface 310 may be configured to be luminescent in different colors.

In various embodiments, at least one of the luminescent plane 302 and the curved luminescent surface 310 may be configured to be luminescent in a pre-determined plurality of colors.

In various embodiments, at least one of the luminescent plane 302 and the curved luminescent surface 310 may be configured to be luminescent in a color gradient.

In various embodiments, at least one of the luminescent plane 302 and the curved luminescent surface 310 may be configured to be luminescent in color segments of different colors.

In various embodiments, the rotational arrangement 300 may further include a first optical element (not shown) fixed to the luminescent plane 302.

In various embodiments, the first optical element may be a lens, for example a cylinder lens, for example a stripe-shaped cylinder lens.

Figure 4:
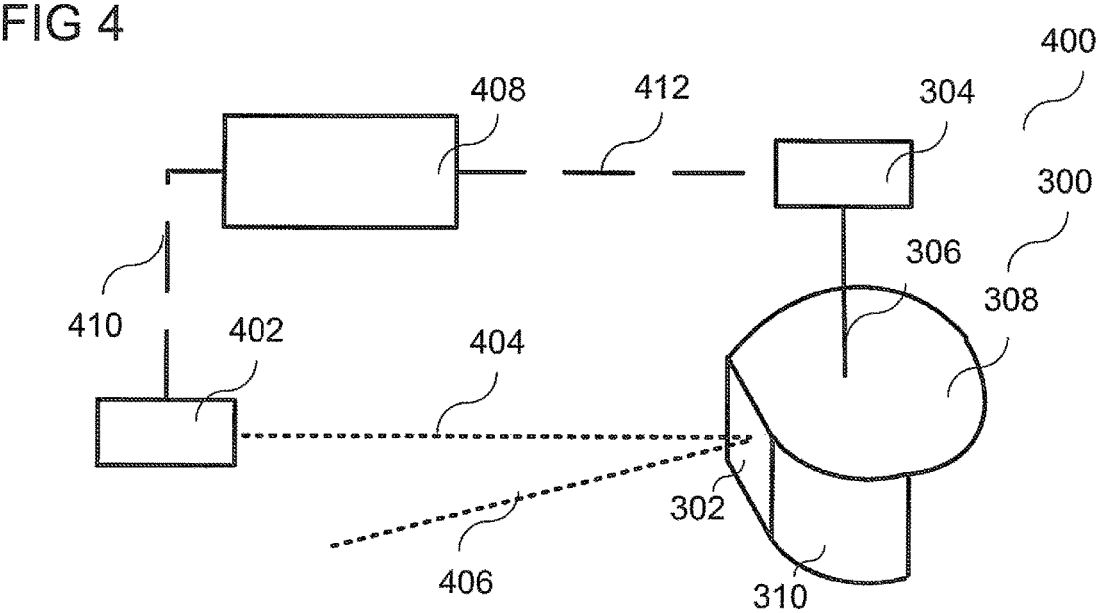
FIG. 4 shows a light source arrangement in accordance with an embodiment.

FIG. 4 shows a light source arrangement 400 in accordance with an embodiment. The light source arrangement 400 may include a primary light source 402 and a secondary light source. The primary light source 402 may be configured to illuminate the secondary light source, like indicated by dotted line 404. The secondary light source may include a rotational arrangement 300, like described above with reference to FIG. 3.

Various features and effects of the light source arrangement 400 may be the same or similar to the light source arrangement 200 described with reference to FIG. 2, and duplicate description thereof may be omitted for sake of brevity.

In various embodiments, the primary light source 402 may include at least one of a laser and a light-emitting diode.

In various embodiments, the primary light source 206 may include at least one of a plurality of lasers and a plurality of light-emitting diodes.

In various embodiments, the primary light source 402 may include a laser configured to scan over at least a part of the surface of the secondary light source.

In various embodiments, the secondary light source may be configured to emit light 406 of a lower energy than the energy of the light of the primary light source.

In various embodiments, light source arrangement 400 may further include a controller 408 configured to control the primary light source 402 and the driving mechanism 304, so that the primary light source 402 is switched between an on state and an off state based on the state of the driving mechanism 304.

In various embodiments, instead of being switched on and off, the intensity of the primary light source may be changed.

The controller 408 and the primary light source 402 may be coupled with each other, e.g. via an electrical connection 410 such as e.g. a cable or a computer bus or via any other suitable electrical connection to exchange electrical signals.

The controller 408 and the driving mechanism 304 may be coupled with each other, e.g. via an electrical connection 412 such as e.g. a cable or a computer bus or via any other suitable electrical connection to exchange electrical signals.

In various embodiments, light source arrangement 400 may further include a cooling device (not shown) configured to cool the secondary light source.

In various embodiments, the cooling device may be an internal cooling device.

In various embodiments, the cooling device may include at least one of a water cooler, a radiator, an air cooler, a heat exchanger, a turbine blade, warped air holes, ventilator rotors, and a heatpipe and the like.

In various embodiments, light source arrangement 400 may further include a fixed optical element (not shown).

In various embodiments, the fixed optical element may be arranged to be passed by light from the secondary light source.

In various embodiments, light source arrangement 400 may further include a mirror (not shown), arranged between the primary light source and the secondary light source.

In various embodiments, the mirror may include (or have) a hole.

In various embodiments, the mirror may be a dichroic mirror.

In various embodiments, the light source arrangement 400 may include a plurality of primary light sources configured to illuminate the secondary light source.

In various embodiments, the secondary light source may include a plurality of optical elements, each fixed to a plane of the secondary light source.

In various embodiments, each primary light source of the plurality of primary light sources may be configured to illuminate at most one optical element of the plurality of optical elements at a time.

In various embodiments, the secondary light source may be configured so that the primary light source 402 may illuminate the plurality of luminescent planes of the secondary light source at a time.

In various embodiments, the secondary light source may be configured so that the primary light source 402 may illuminate the plurality of luminescent planes of the same color of the secondary light source at a time.

In various embodiments, the secondary light source may be configured so that the primary light source 402 may illuminate the plurality of luminescent planes of different colors of the secondary light source at a time.

In various embodiments, a projector may include a light source arrangement according to one of the above described embodiments. The projector may be a data projector, a video projector, or a wallwasher, as will be explained below.

Figure 5:
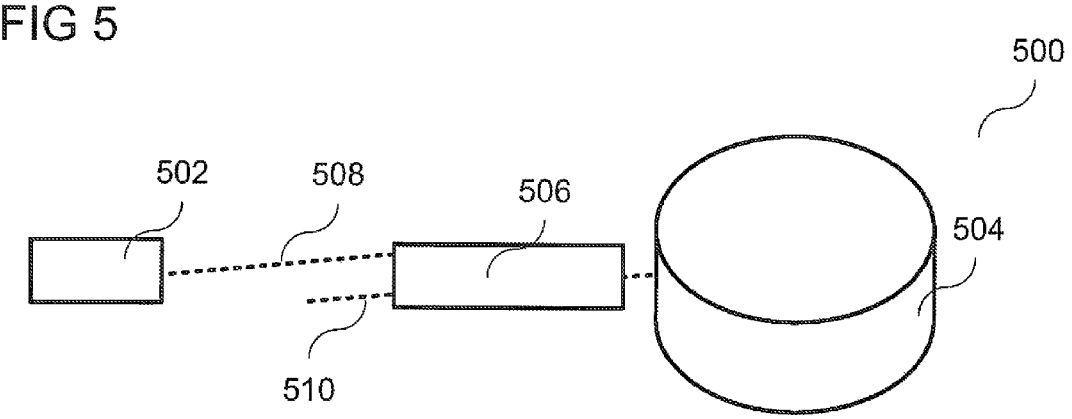
FIG. 5 shows a light source device in accordance with an embodiment.

FIG. 5 shows a light source device 500 in accordance with an embodiment. The light source device may include a primary light source 502, a secondary light source 504 including a cylinder, wherein at least a part of the side area of the cylinder may be luminescent, and an integrating optical element 506. The primary light source 502, the secondary light source 504 and the integrating optical element 506 may be arranged so that light 508 from the primary light source 502 is internally reflected inside the integrating optical element 506 before arriving at the secondary light source 504.

Various features and effects of the light source device 500 may be the same or similar to the light source arrangement 200 described with reference to FIG. 2 or to the light source arrangement 400 described with reference to FIG. 4, and duplicate description thereof may be omitted for sake of brevity.

In various embodiments, light 510 from the secondary light source 504 may be output through the integrating optical element 506.

Figure 6A:
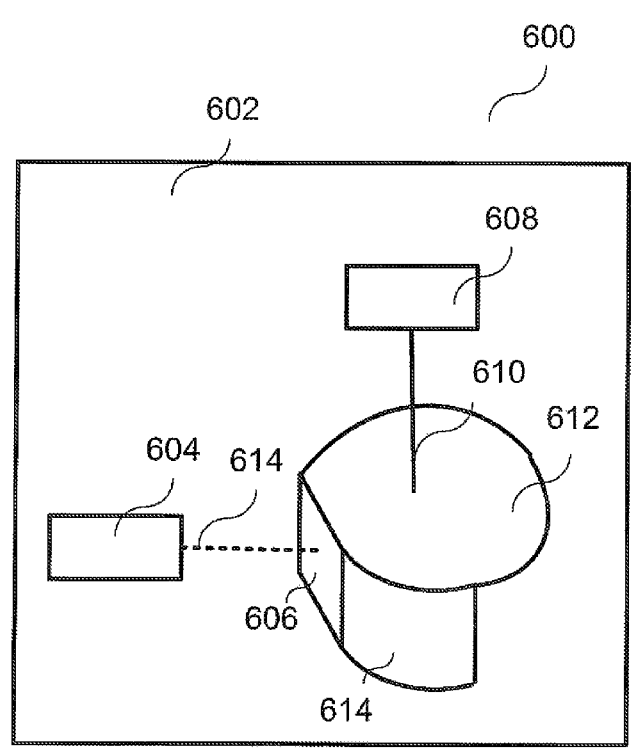
FIGS. 6A and 6B show a rotational arrangement in accordance with an embodiment.
Figure 6B:
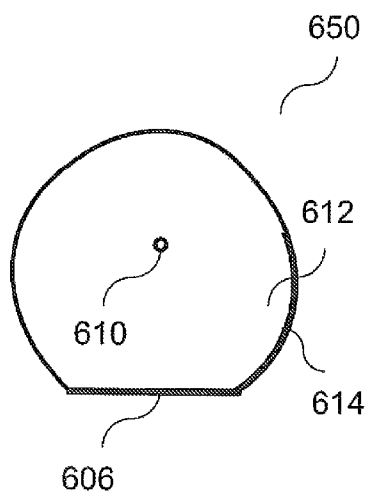

FIG. 6A shows a lighting device 600 in accordance with an embodiment in a perspective view. FIG. 6B shows a part 650 of the lighting device 600 in a top view. The lighting device 600 may include a light source 604, a filter plane 606 (which may also be referred to as a plane of a secondary light source), and a driving mechanism 608 fixed to the filter plane 606, wherein the driving mechanism 608 may include an axis of rotation, wherein the angle between the axis of rotation and the filter plane 606 may be an acute angle. The parts of the lighting device 600 may be provided as one device inside a casing 602. The casing 602 may have an opening (not shown) to allow light to exit the casing.

In various embodiments, the driving mechanism 608 may be fixed to the filter plane 606 by means of a rod 610 and an additional plane 612.

In various embodiments, light 614 from the light source may be filtered by means of the filter of the filter plane 606, and may then exit the casing 602.

Various features and effects of the lighting device 600 may be the same or similar to the light source arrangement 200 described with reference to FIG. 2 or to the light source arrangement 400 described with reference to FIG. 4, and duplicate description thereof may be omitted for sake of brevity.

In various embodiments, the driving mechanism may include a joint.

In various embodiments, the driving mechanism may include an actuator.

In various embodiments, the driving mechanism may include an electric actuator.

In various embodiments, the lighting device 600 may further include a plurality of filter planes.

In various embodiments, the lighting device 600 may further include a polyhedron, wherein a first filter face of the polyhedron may include the filter planes 606.

In various embodiments, the lighting device 600 may further include an edge between at least two filter planes of the plurality of filter planes.

In various embodiments, the lighting device 600 may further include a curved filter surface 614.

In various embodiments, an acute angle may be understood as an angle lower than 90 degrees.

In various embodiments, the acute angle may be an angle lower than 5 degrees.

In various embodiments, the acute angle may be equal to or substantially equal to 0.

In various embodiments, the axis of rotation and the normal of the filter plane may be perpendicular.

In various embodiments, at least one of the filter plane and the curved filter surface 614 may include a reflective surface.

In various embodiments, at least one of the filter plane and the curved filter surface 614 may be configured to be a filter of a pre-determined color.

In various embodiments, at least two of the plurality of filter planes (including the filter plane 606) and the curved filter surface 614 may be configured to be filter of different colors.

In various embodiments, at least one of the plurality of filter planes (including the filter plane 606) and the curved filter surface 614 may be configured to be a filter of a pre-determined plurality of colors.

In various embodiments, at least one of the plurality of filter planes (including the filter plane 606) and the curved filter surface may be configured to be a filter of a color gradient.

In various embodiments, at least one of the plurality of filter planes (including the filter plane 606) and the curved filter surface may be configured to be a filter of color segments of different colors.

In various embodiments, the lighting device 600 may further include a first optical element fixed to the filter plane.

In various embodiments, the first optical element may be a lens, for example a cylinder lens, for example a stripe-shaped cylinder lens.

In various embodiments, the light emitted from the filter may be light of a lower energy than the energy of light of the light source.

In various embodiments, the light source 604 may include at least one of a laser and a light-emitting diode.

In various embodiments, the primary light source 206 may include at least one of a plurality of lasers and a plurality of light-emitting diodes.

In various embodiments, the light source 604 may include a laser configured to scan over at least a part of the filter plane 606.

In various embodiments, the lighting device 600 may further include a controller (not shown) configured to control the light source 604 and the driving mechanism 608, so that the light source 604 is switched between an on state and an off state based on the state of the driving mechanism 608.

In various embodiments, instead of being switched on and off, the intensity of the light source may be changed.

In various embodiments, the lighting device 600 may further include a cooling device (not shown) configured to cool the filter plane 606.

In various embodiments, the cooling device may be an internal cooling device.

In various embodiments, the cooling device may include at least one of a water cooler, a radiator, an air cooler, a heat exchanger, a turbine blade, warped air holes, ventilator rotors, and a heatpipe and the like.

In various embodiments, the lighting device 600 may further include a fixed optical element (not shown).

In various embodiments, the fixed optical element may be arranged to be passed by light from the filter plane 606.

In various embodiments, the lighting device 600 may further include a mirror (not shown), arranged between the light source and the filter plane.

In various embodiments, the mirror may include (or have) a hole.

In various embodiments, the mirror may be a dichroic mirror.

In various embodiments, the lighting device 600 may include a plurality of light sources configured to illuminate the plurality of filter planes.

In various embodiments, the lighting device 600 may further include a plurality of optical elements, each fixed to a filter plane of the plurality of filter planes.

In various embodiments, each light source of the plurality of light sources may be configured to illuminate at most one optical element of the plurality of optical elements at a time.

In various embodiments, the lighting device 600 may be configured so that the light source 604 illuminates more than one of the plurality of filter planes at a time.

In various embodiments, the lighting device 600 may be configured so that the light source 604 illuminates more than one of the plurality of filter planes of the same color at a time.

In various embodiments, the lighting device 600 may be configured so that the light source 604 illuminates more than one of the plurality of filter planes of different colors at a time.

In various embodiments, a projector may include a lighting device 600 according to one of the above described embodiments.

According to various embodiments, a three-dimensional body (not shown) may be provided. The three-dimensional body may be elongated in a longitudinal direction. The three-dimensional body may include a luminescent region of its surface, and an edge on its surface, wherein the edge may extend in the longitudinal direction. For example, according to an embodiment, a roll, the surface of which is curved like an American Football may be provided, wherein the single cones of radiation may be faned out according to the radiation.

The three-dimensional body may be used as a secondary light source according to various embodiments. For example, the three-dimensional body may be used instead of or in addition to a polyhedron, as explained above.

Furthermore, in a light source arrangement, the three-dimensional body may be rotated around an axis, wherein the axis may extend in the longitudinal direction.

FIGS. 7A and 7B show illustrations 700 and 750 of a Lambert radiator. When directly illuminated from a light source 702, a spot or an area on a surface 704, which is a Lambert radiator, radiates the light according to Lambert's cosine law, as indicated by arrows 706 in a circle.

FIG. 7A shows an illustration 700 of Lambert's cosine law for the case where the surface 704 and the radiation from the light source 702 draw an angle of about 45 degrees.

FIB. 7B shows an illustration 750 of Lambert's cosine law for the case where the normal of the surface 704 and the direction of the radiation from the light source 702 are about parallel.

As will has been explained above and will be explained below, color discs with lateral color centers or color filters may be provided and may be used for projection of images and for effect lighting, and may be used for converting light into other colors or for filtering of white light.

Projection of images may be performed in at least two different ways, wherein according to the image information, the desired pixel color is to be assembled. For example, a white light source may be filtered or the colors may be generated separately. For the example with white light sources, filtering may be performed by color wheels (with single color segments, through which light is passed) or the light may be separated into the single basic colors by suitable optical components. In another example, LEDs (light-emitting diodes) respectively semi-conductor lasers may be used to generate the basic colors separately. In the example with a laser, for example a phosphor wheel, which on the surface has different phosphor compounds, may be illuminated. With this, blue laser light may be converted into for example red and green light.

Figure 8:
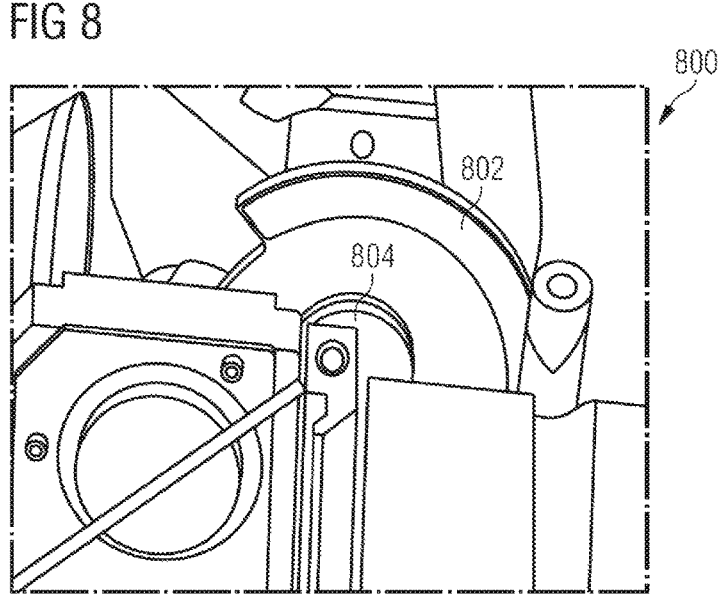
FIG. 8 shows an example of a phosphor wheel.

FIG. 8 shows an example of a phosphor wheel 802 in a device 800. The phosphor wheel may rotate around an axis 804, so that regions of different color (for example with phosphor surface) may come into effect. For example, the phosphor wheel may have a plurality of regions with a phosphor-surface.

Figure 9:
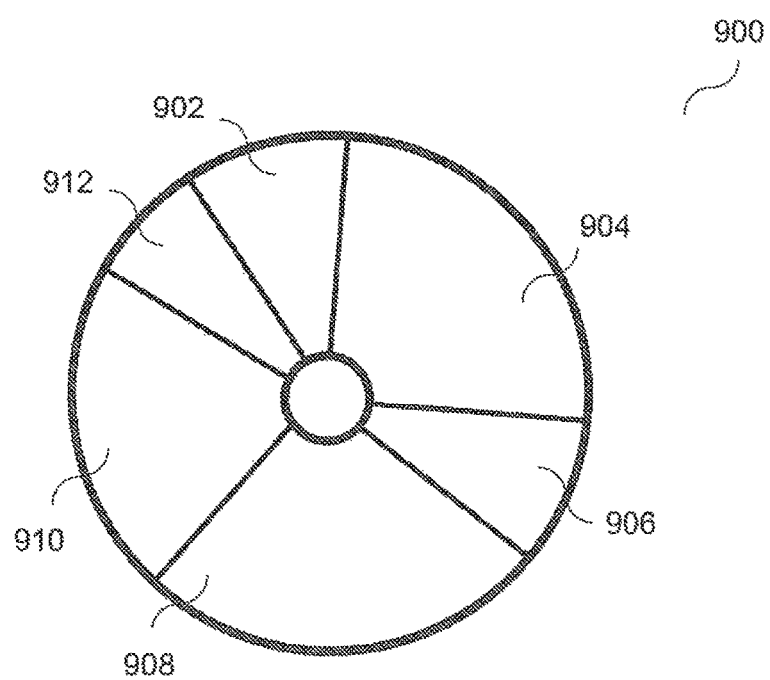
FIG. 9 shows an example of a phosphor wheel.

FIG. 9 shows an example of a phosphor wheel 900, where a plurality of different sectors with filter elements of different colors or a plurality of different sectors with phosphor-surfaces may be present. For example, a first sector 902 may be a cyan filter, a second sector 904 may be a green filter, third sector 906 may be a yellow filter, a fourth sector 908 may be a red filter, a fifth sector 910 may be a blue filter, and a sixth sector 912 may be transparent. For example, in the different sectors, instead of filter, phosphor-surfaces of the respective colors may be provided.

Figure 10:
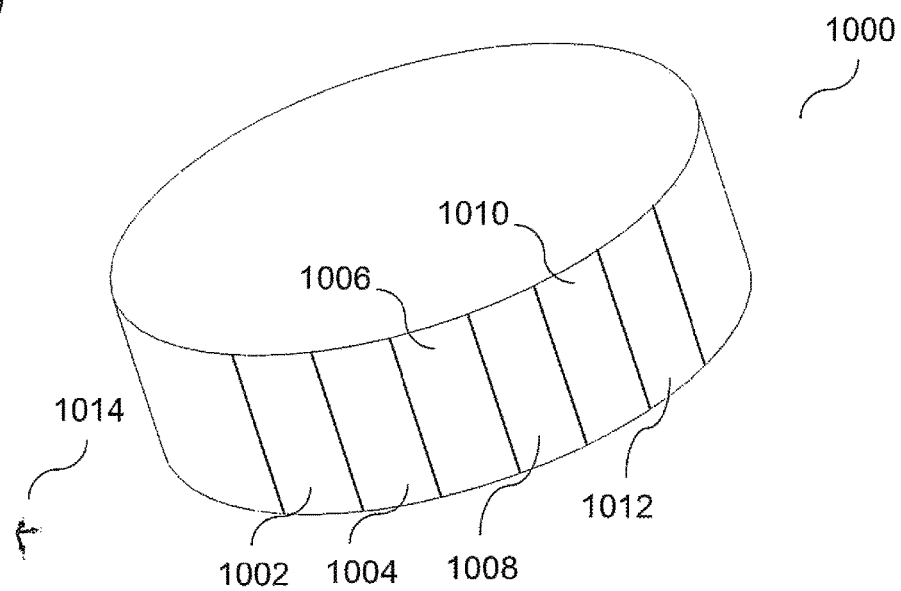
FIG. 10 shows a color disc in accordance with an embodiment.

FIG. 10 shows a color disc 1000 in accordance with an embodiment. The color disc may have a round surface. For example, the color disc 1000 may have the form of a cylinder with a circle as cross section. On its lateral area, the color disc may have regions configured to provide colors when excited, for example, regions of luminescent behavior. For example, the color disc 1000 may have a first luminescent area 1002 for a first color (for example pink), a second luminescent area 1004 for a second color (for example orange), a third luminescent area 1006 for a third color (for example purple), a fourth luminescent area 1008 for a fourth color (for example green), a fifth luminescent area 1010 for a fifth color (for example red), and a sixth luminescent area 1012 for a sixth color (for example yellow). The first to sixth colors may be different, but do not have to be different. Although five areas are shown, any number of areas may be provided. Besides luminescent areas, also areas that are not luminescent may be provided on the color wheel 1000. It will be understood that instead of luminescent surfaces, also filters, for example color filter, may be used. A coordinate system 1014 is also shown.

Figure 11:
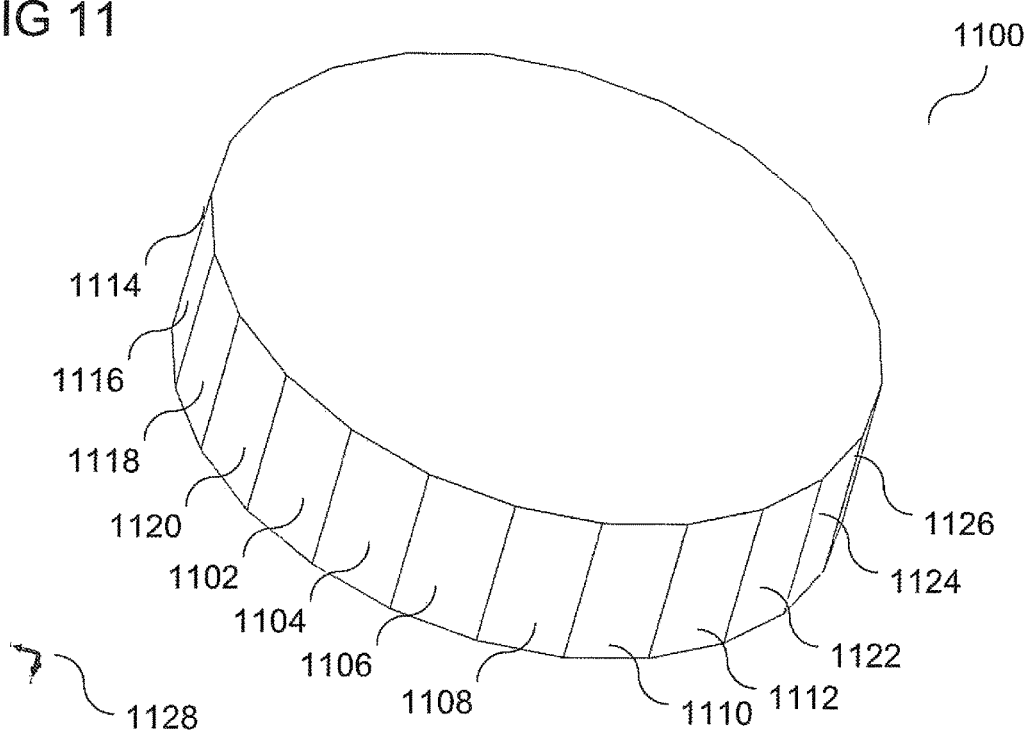
FIG. 11 shows a color disc in accordance with an embodiment.

FIG. 11 shows a color disc 1100 in accordance with an embodiment. The color disc 1100 may include a plurality of single facets. For example, the color disc 1100 may have the form of a cylinder with a polygon as cross section, which will be understood to be a polyhedron with a plurality of faces. Each facet or face may be configured to provide a color when excited, for example. For example, the color disc 1100 may have a first luminescent facet 1102 for a first color, a second luminescent facet 1104 for a second color, a third luminescent facet 1106 for a third color, a fourth luminescent facet 1108 for a fourth color, a fifth luminescent facet 1110 for a fifth color, and a sixth luminescent facet 1112 for a sixth color. The first to fifth color may be different, but do not have to be different. Furthermore, further facets 1114 to 1126 may be provided. Although thirteen facets are shown, any number of facets may be provided. Furthermore, although the colored facets are shown to be adjacent faces, the colored faces may be non-adjacent, or only a part of the colored facets may be adjacent to each other, and other colored facets may be provided non-adjacent. Besides luminescent facets, also facets that are not luminescent may be provided on the color wheel 1100. It will be understood that instead of luminescent surfaces, also filters, for example color filter, may be used. A coordinate system 1128 is also shown.

According to various embodiments, a color wheel may be illuminated or lighted through on its lateral surface, wherein this surface may be round (like for example shown in FIG. 10) or have single facets (like for example shown in FIG. 11). With this, it may be possible to use the principle of generation or filtering of color.

Figure 12:
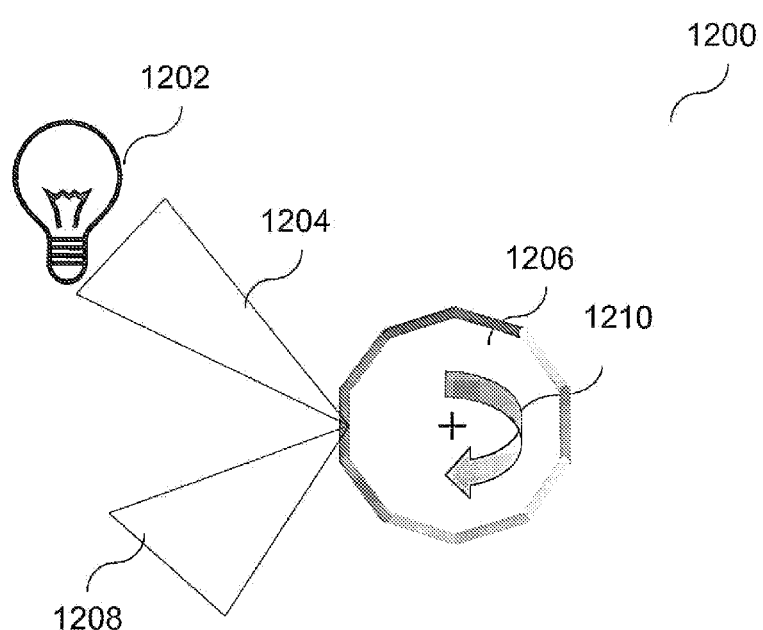
FIG. 12 shows a light source arrangement in accordance with an embodiment.

FIG. 12 shows a light source arrangement 1200 in accordance with an embodiment. With the light source arrangement 1200, filtering of color may be performed. A white light source 1202 may illuminate under a pre-determined angle the outer surface of a color disc 1206, as indicated by irradiating light cone 1204. The surface of the color disc 1206 may be reflective and provided with color filter elements, so that a reflected light cone 1208 of a pre-determined color may be generated. According to the filter elements, different colors may be generated, which may generate an image with a downstream digital micromirror device (DMD) or LCD (liquid crystal display) panel.

The disc 1206 with color filter facets may be rotating, like indicated by arrow 1210.

The white light source 1202 may be an LED or a P-VIP (a high-pressure mercury lamp for projectors).

Figure 13:
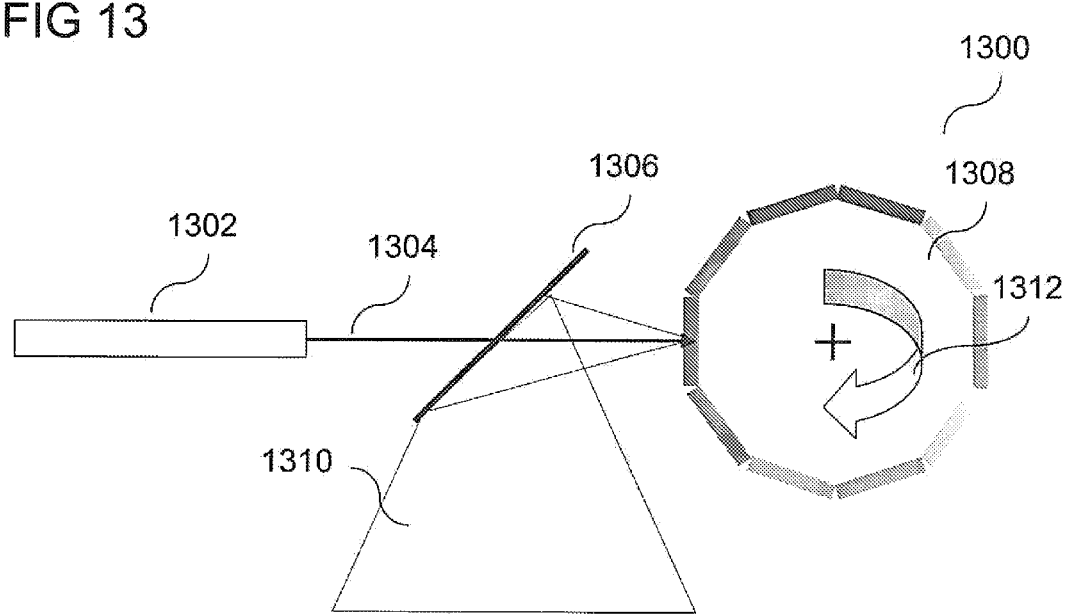
FIG. 13 shows a light source arrangement in accordance with an embodiment.

FIG. 13 shows a light source arrangement 1300 in accordance with an embodiment. With the light source arrangement 1300, generation of different colors may be performed. A disc 1308 that may be rotating like indicated by arrow 1312 may have facets that may be coated with suitable phosphor compounds. A laser source 1302 may illuminate the surface of the rotating color disc 1308. Depending on the angular orientation of the color disc, corresponding colors may be generated. The laser 1302 may illuminate the rotating disc through a mirror 1306 as indicated by line 1304. The mirror may have a hole or may be a dichroic mirror, so that the laser light may pass and the generated light may be radiated as an emitted light cone 1310.

By use of a color disc (in other words: a color wheel) with filters according to various embodiments, no back reflections may occur. Furthermore, no problems with spokes when changing between two colors may occur. For example, for color discs with facets, two color cones may be radiated into different directions. Furthermore, clearer colors and less mixed colors may occur, because filtering may take place at a position of high local speed of the disc.

By use of a color disc (in other words: a color wheel) with a luminescent surface according to various embodiments, for example, good cooling conditions of the phosphor element may be provided. Furthermore, no problems with spokes when changing between two colors may occur. For example, for color discs with facets, two color cones may be radiated into different directions. Furthermore, clearer colors and less mixed colors may occur, because filtering may take place at a position of high local speed of the disc.

Figure 14:
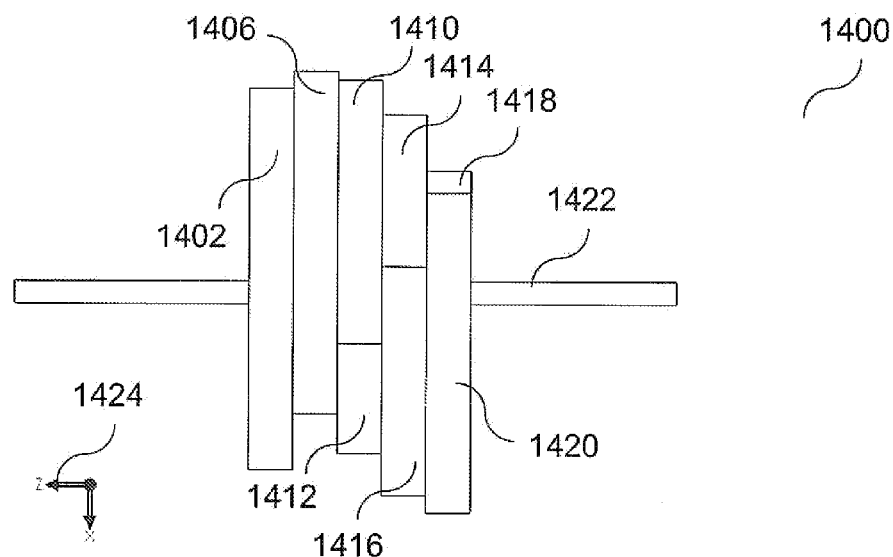
FIG. 14 shows a secondary light source in accordance with an embodiment.

FIG. 14 shows a front view of a secondary light source 1400 in accordance with an embodiment. The secondary light source may have the form of a cascaded color roll or saw tooth. The secondary light source 1400 may include a plurality of cascaded color discs, for example a plurality of color discs with facets like described above.

For example, the secondary light source 1400 may include a first luminescent face 1402 of a first disc and a second luminescent face (not shown) of the first disc, a first luminescent face 1406 of a second disc and a second luminescent face (not shown) of the second disc, a first luminescent face 1410 of a third disc and a second luminescent face 1412 of the third disc, a first luminescent face 1414 of a fourth disc and a second luminescent face 1416 of the fourth disc, a first luminescent face 1418 of a fifth disc and a second luminescent face 1420 of the fifth disc. Although five discs are shown, any number of discs may be cascaded. Furthermore, the secondary light source 1400 does not have to be separated into discs, but may have a polyhedron of the same shape without division into separate discs. The secondary light source may be rotated around axis 1422. Furthermore, each disc may have further faces, for example a third face, a fourth face, and so on. The discs may be rotated one against the other by a pre-determined amount. A coordinate system 1424 is also shown.

Figure 15:
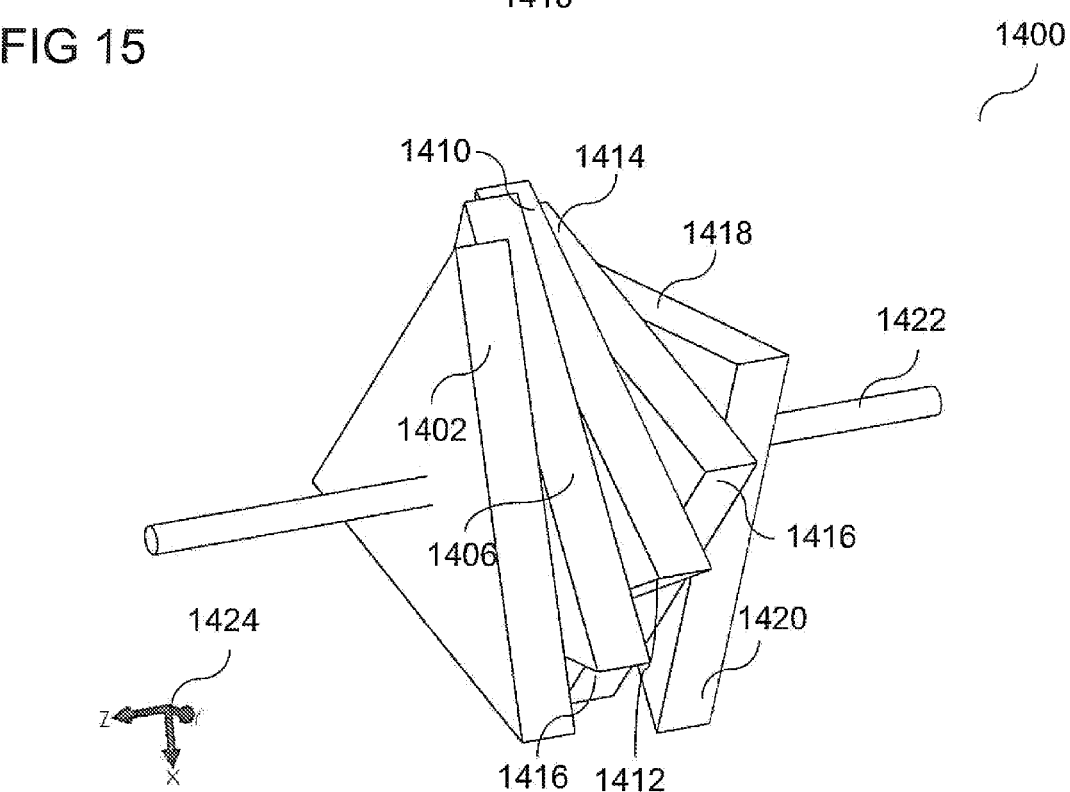
FIG. 15 shows a secondary light source in accordance with an embodiment.

FIG. 15 shows a perspective view of the secondary light source 1400 in accordance with an embodiment.

Figure 16:
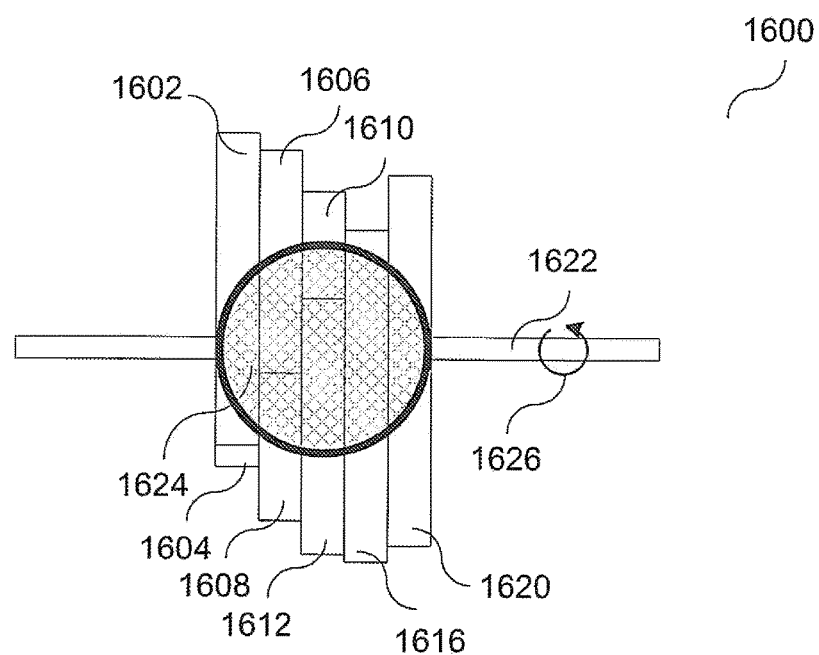
FIG. 16 shows a secondary light source in accordance with an embodiment.

FIG. 16 shows a front view of a secondary light source 1600 in accordance with an embodiment. The secondary light source may have the form of a cascaded color roll or saw tooth. The secondary light source 1600 may include a plurality of cascaded color discs, for example a plurality of color discs with facets like described above.

For example, the secondary light source 1600 may include a first luminescent face 1602 of a first disc and a second luminescent face 1604 of the first disc, a first luminescent face 1606 of a second disc and a second luminescent face 1608 of the second disc, a first luminescent face 1610 of a third disc and a second luminescent face 1612 of the third disc, a first luminescent face (not shown) of a fourth disc and a second luminescent face 1616 of the fourth disc, a first luminescent face (not shown) of a fifth disc and a second luminescent face 1620 of the fifth disc. Although five discs are shown, any number of discs may be cascaded. Furthermore, the secondary light source 1600 does not have to be separated into discs, but may have a polyhedron of the same shape without division into separate discs. The secondary light source may be rotated around axis 1622 as indicated by arrow 1626. Furthermore, each disc may have further faces, for example a third face, a fourth face, and so on. The discs may be rotated one against the other by a pre-determined amount.

The faces of the secondary light source 1600 may be configured so that neighboring facets preferable are of the same color (in other words: are coated with phosphor compounds so as to generate light of the same color when excited), and changes in color between neighboring faces are rare. For example, the first faces of all of the discs may have a first color, and the second faces of all of the discs may have a second color. When illuminated by a laser spot 1624 (excitation spot), faces of at most two colors may be illuminated on the secondary light source, and faces of only one color may also be illuminated at pre-determined rotation angles of the secondary light source. The cascaded color roll 1600 may be used for generation of RGB (red-green-blue) colors, for example when each disc has three faces.

Figure 17:
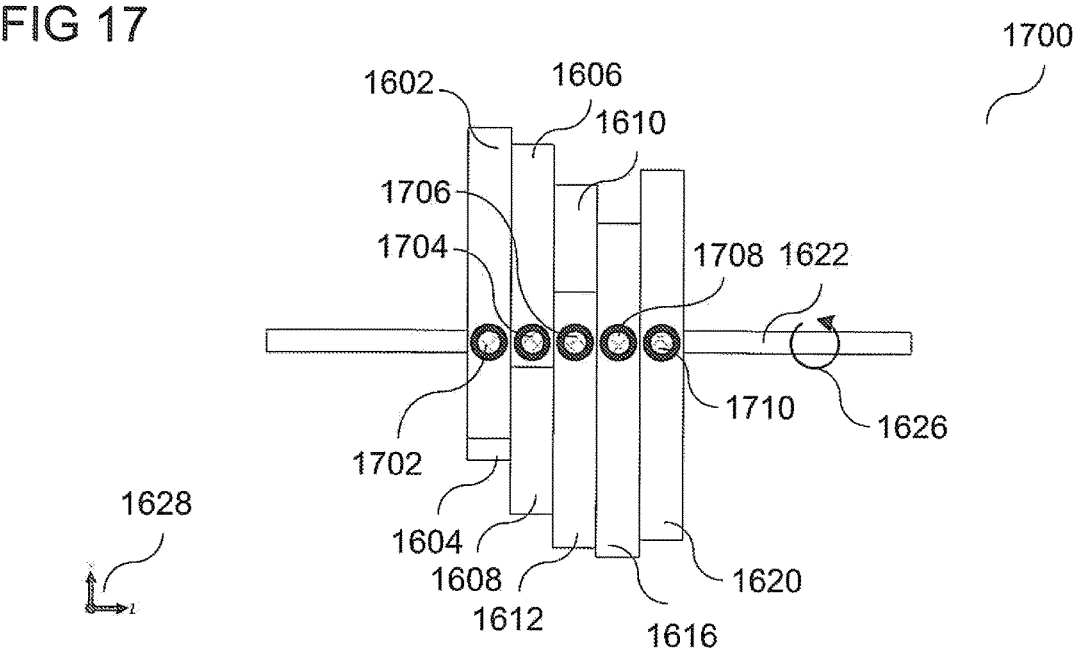
FIG. 17 shows a secondary light source in accordance with an embodiment.

FIG. 17 shows a secondary light source 1700 in accordance with an embodiment. Various features and effects of the secondary light source 1700 may be the same or similar to the secondary light source 1600 described with reference to FIG. 16, and duplicate description thereof may be omitted for sake of brevity.

According to various embodiments, the secondary light source 1700 may be illuminated by a plurality of lasers or a plurality of LEDs, for example a first laser 1702, a second laser 1704, a third laser 1706, a fourth laser 1708, and a fifth laser 1710.

According to various embodiments, the plurality of lasers may be arranged in an array, so that a row of lasers is provided. According to various embodiments, the number of lasers in the array may be at least the number of discs in the toothed arrangement (in other words: the number of discs in the cascaded color roll).

Figure 18:
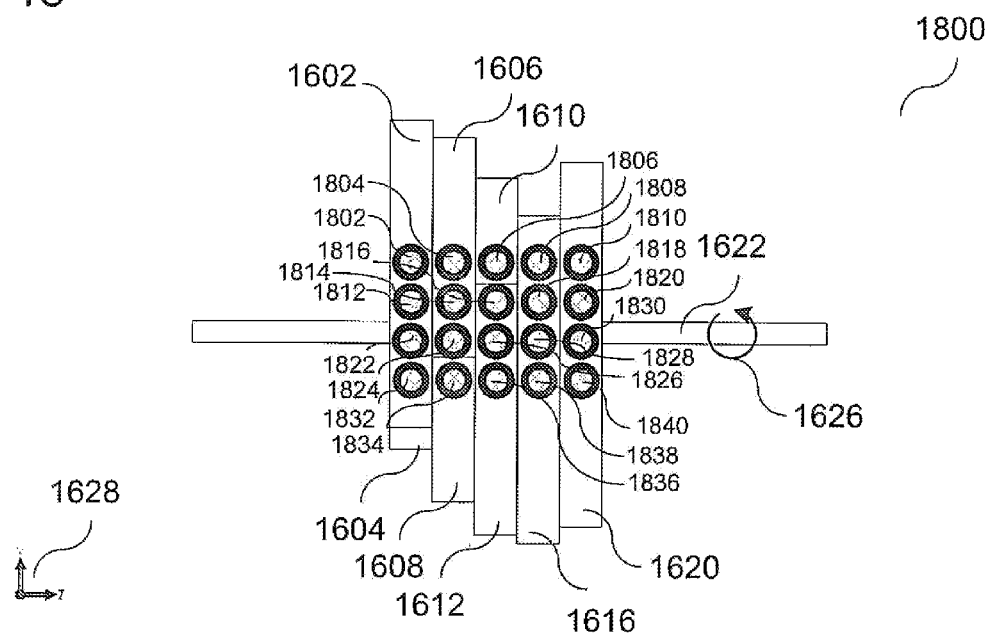
FIG. 18 shows a secondary light source in accordance with an embodiment.

FIG. 18 shows a secondary light source 1800 in accordance with an embodiment. Various features and effects of the secondary light source 1800 may be the same or similar to the secondary light source 1600 described with reference to FIG. 16 or the secondary light source 17 described with reference to FIG. 17, and duplicate description thereof may be omitted for sake of brevity.

According to various embodiments, the secondary light source 1800 may be illuminated by a plurality of lasers or a plurality of LEDs, for example a first laser 1802, a second laser 1804, a third laser 1806, a fourth laser 1808, a fifth laser 1810, a sixth laser 1812, a seventh laser 1814, an eighth laser 1816, a ninth laser 1818, a tenth laser 1820, an eleventh laser 1822, a twelfth laser 1824, a thirteenth laser 1826, a fourteenth laser 1828, a fifteenth laser 1830, a sixteenth laser 1832, a seventeenth laser 1834, an eighteenth laser 1836, a nineteenth laser 1838, and a twentieth laser 1840.

According to various embodiments, the plurality of lasers may be arranged in an array, so that a plurality of rows of lasers is provided stacked over each other. According to various embodiments, the number of lasers in each row of the array may be at least the number of discs in the toothed arrangement (in other words: the number of discs in the cascaded color roll). For example, an array of 4 rows and 5 columns of lasers may be provided, as illustrated in FIG. 18.

Figure 19:
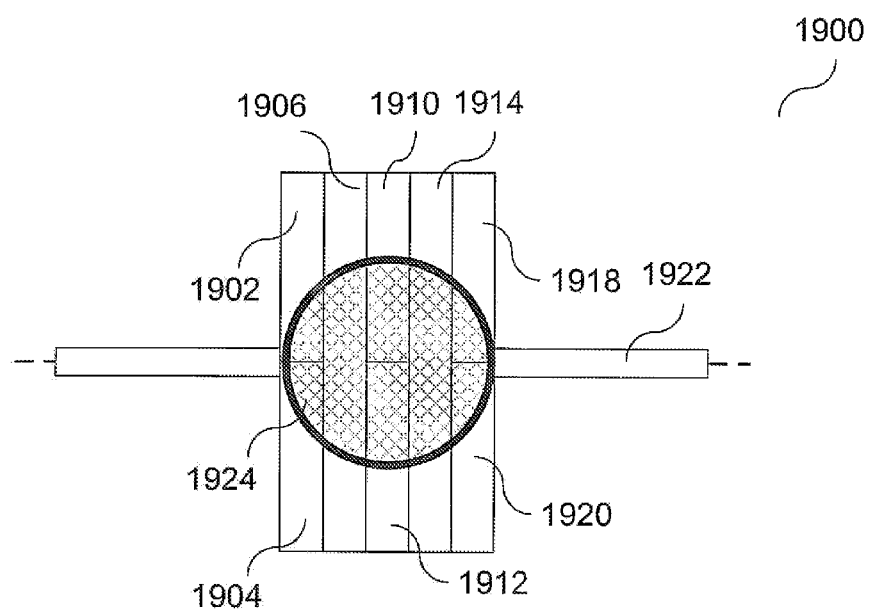
FIG. 19 shows a secondary light source in accordance with an embodiment.

FIG. 19 shows a front view of a secondary light source 1900 in accordance with an embodiment. The secondary light source may have the form of a cascaded color roll or saw tooth. The secondary light source 1900 may include a plurality of cascaded color discs, for example a plurality of color discs with facets like described above.

For example, the secondary light source 1900 may include a first luminescent face 1902 of a first disc and a second luminescent face 1904 of the first disc, a first luminescent face 1906 of a second disc and a second luminescent face (not shown) of the second disc, a first luminescent face 1910 of a third disc and a second luminescent face 1912 of the third disc, a first luminescent face 1914 of a fourth disc and a second luminescent face (not shown) of the fourth disc, a first luminescent face 1918 of a fifth disc and a second luminescent face 1920 of the fifth disc. Although five discs are shown, any number of discs may be cascaded. Furthermore, the secondary light source 1900 does not have to be separated into discs, but may have a polyhedron of the same shape without division into separate discs. The secondary light source may be rotated around axis 1922. Furthermore, each disc may have further faces, for example a third face, a fourth face, and so on. The discs may be rotated one against the other by a predetermined amount.

The faces of the secondary light source 1600 may be configured so that neighboring facets preferable are of the different colors (in other words: are coated with phosphor compounds so as to generate light of the different colors when excited).

When illuminated by a laser spot 1924 (excitation spot), faces of different colors may always be illuminated on the secondary light source, independent from the rotation angle.

The cascaded color roll 1900 may be used for generation of white light. For example, all three different colors of red, green and blue present on the cascaded color roll may always be simultaneously.

According to various embodiments, a plurality of lasers or a plurality of LEDs may be provided as a primary light source, like explained with reference to FIG. 17 and FIG. 18.

Figure 20:
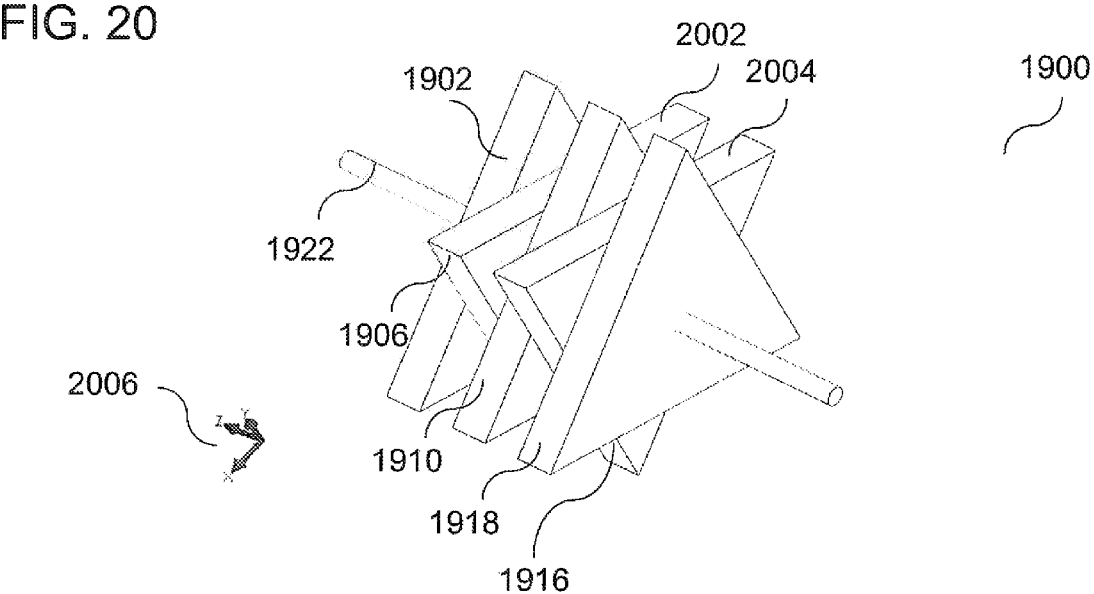
FIG. 20 shows a secondary light source in accordance with an embodiment.

FIG. 20 shows a perspective view of the secondary light source 1900 in accordance with an embodiment. A further facet 2002 of the second disc and a further facet 2004 of the fourth disc are shown. A coordinate system 2006 is also shown.

Figure 21:
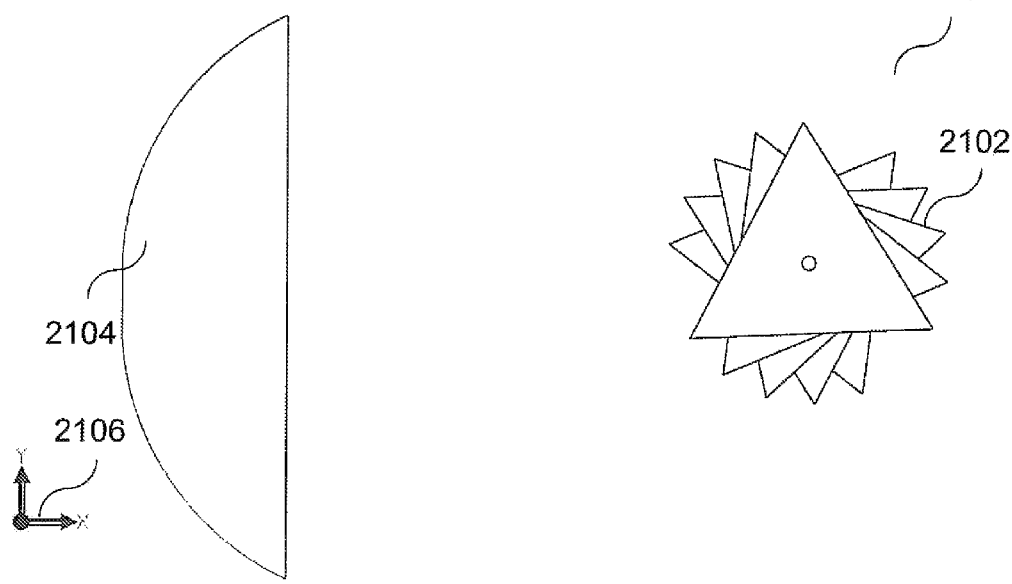
FIG. 21 shows a secondary light source in accordance with an embodiment.

FIG. 21 shows a top view of a secondary light source 2100 in accordance with an embodiment. The secondary light source 2100 may include a toothed color disc 2102 like explained above, and an optical element 2104, as will be explained in more detail below. A coordinate system 2106 is also shown.

Figure 22:
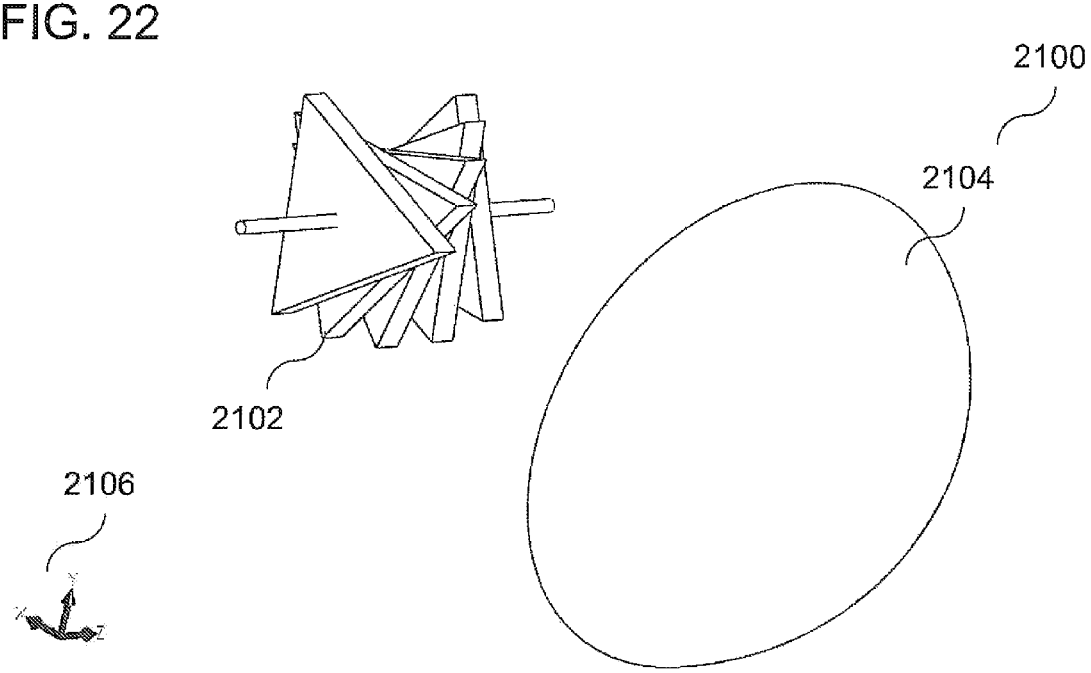
FIG. 22 shows a secondary light source in accordance with an embodiment.

FIG. 22 shows a perspective view of the secondary light source 2100 in accordance with an embodiment.

Figure 23:
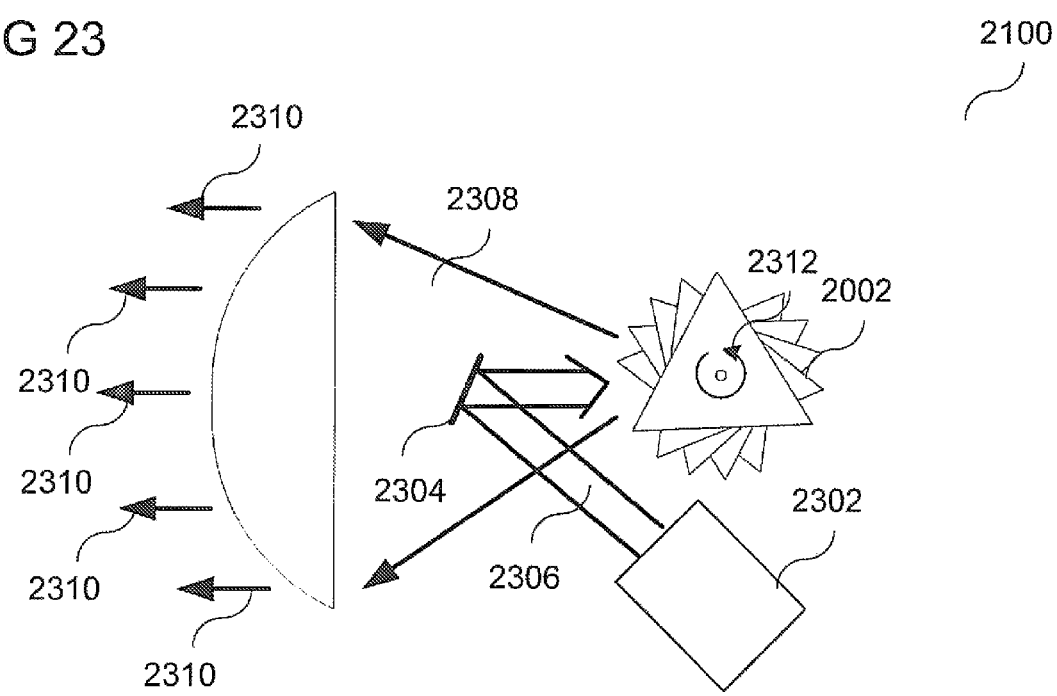
FIG. 23 shows a light source arrangement in accordance with an embodiment.

FIG. 23 shows another top view of the light source arrangement 2100 in accordance with an embodiment. A laser 2302 for excitation may illuminate the toothed (in other words: cascaded) color disc (in other words: color roll) 2102 as indicated by ray 2306 via a mirror 2304. The color disc 2102 may rotate in any direction, for example like indicated by arrow 2312. The light generated by the color roll 2102 may arrive at the optical element 2104, which may be a fixed lens, for example a cylinder lens, for example a stripe-shaped cylinder lens, as indicated by rays 2308, and the direction of the light may be changed, as indicated by arrows 2310.

The light source arrangement 2100 may be used as an entertainment floodlight or spotlight.

According to various embodiments, a high number of toothed faces may be used, because then the colors may mix smoothly.

By use of the cascaded color roll 2102, the light generated by the secondary light source may not be rotating with the secondary light source. With a suitable toothed color roll 2102, in average, the whole lens 2104 may be illuminated even when the cascaded color roll 2102 is rotating. Although an example with a triangular cross section of the color roll is shown, it will be understood that any number of face may be present in any of the single discs.

According to various embodiments, in the cascaded color roll (for example in any one of the cascaded color rolls explained with reference to FIGS. 14 to 23), the color discs may be configured to be movable (for example rotatable) against each other (in other words: may be movable independent from each other). For example, in a configuration step, the angle between the faces of the various color discs may be configured to be changed. According to various embodiments, effect lighting and a white light source (for example an effective white light source) may be provided with the same cascaded color roll (in other words, with only one set of segments). For example, a secondary light source 1400 like explained with reference to FIG. 14 may be re-configured to (in other words: may be changed to) a light source 1900 like explained with reference to FIG. 19.

Figure 24:
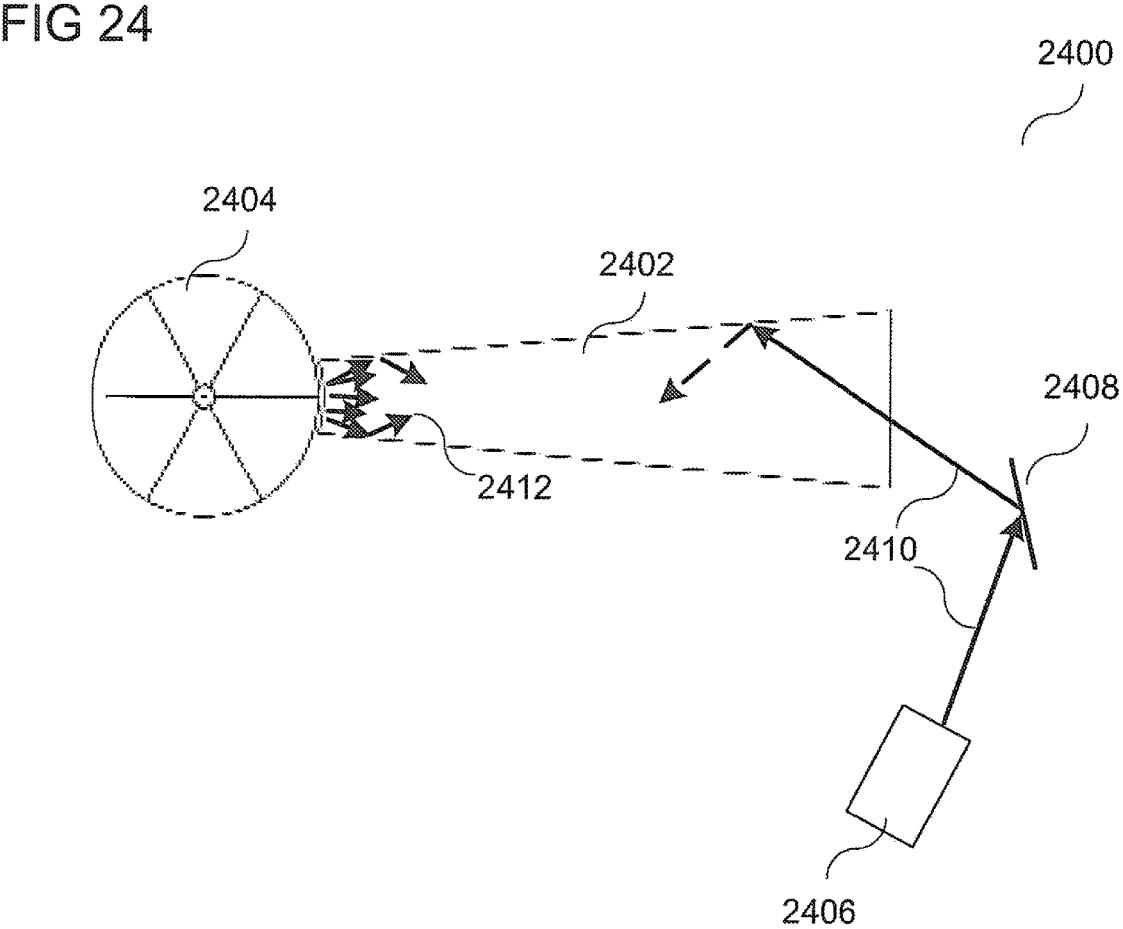
FIG. 24 shows a light source arrangement in accordance with an embodiment.

FIG. 24 shows a light source arrangement 2400 in accordance with an embodiment, which may be used for video projection. The light source arrangement may include a light mixer 2402 and a color disc 2404, as explained above, for example with the different colors of red, green, blue, cyan, magenta, and yellow. Light that may be provided from a laser 2406 may be provided to the light mixer 2402 via a mirror 2408 as indicated by arrows 2410, and may be mixed and may illuminate phosphor areas on the disc 2404, as will be explained in more detail below. The laser power may be modulated, so that the different color segments of the disc may be illuminated differently. A round construction may be provided, and any number of segments may be used. The illuminated color segments may generate light 2412 which may be input into the light mixer. The color segments may also be referred to as radiating remote phosphor.

Figure 25:
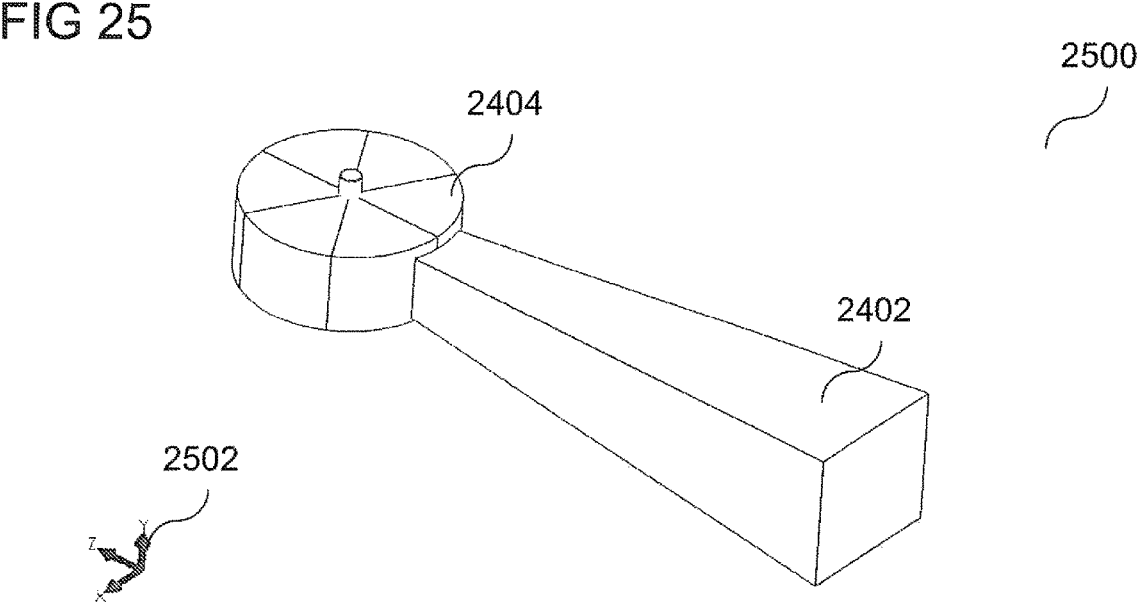
FIG. 25 shows a secondary light source in accordance with an embodiment.

FIG. 25 shows the secondary light source 2500 of the light source arrangement 2400 in a perspective view in accordance with an embodiment. The light mixer 2402 and the color disc 2404 of the light source arrangement 2400 are shown. A coordinate system 2502 is also shown.

Figure 26:
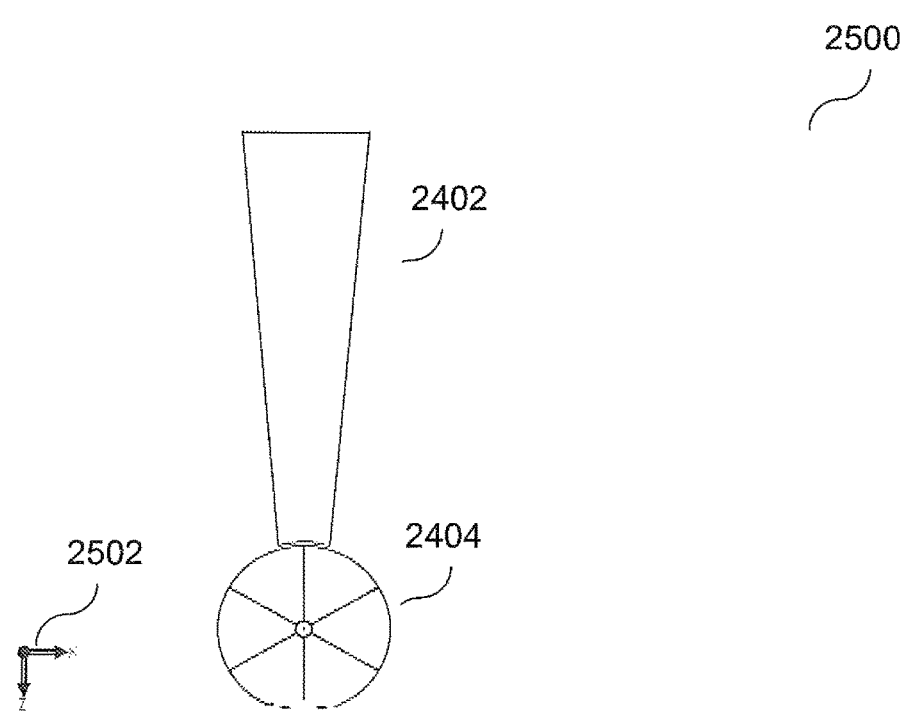
FIG. 26 shows a secondary light source in accordance with an embodiment.

FIG. 26 shows the secondary light source 2500 of the light source arrangement 2400 in a top view in accordance with an embodiment.

According to various embodiments, a light source device and a projector with such a light source device may be provided.

According to various embodiments, a light source device with at least one cooling device, at least one luminescent material, at least on excitation radiation source with a laser source and at least one optical element, which may be arranged between the at least von excitation radiation source and the at least one luminescent material, may be provided.

Furthermore, a projector with such a light source device and a device for coupling of fibers, for example an endoscope, with such a light source may be provided.

According to various embodiments, for use in applications of projection or in devices for coupling of fibers, for example in endoscopes, light source devices with high average light densities may be provided.

According to various embodiments, a light source device may be provided. The light source device may include at least one cooling device. The light source device may include at least one luminescent material. The light source device may include at least one excitation radiation source with a laser source. The light source device may include at least one optical element, which may be provided between the at least one excitation radiation source and the at least one luminescent material.

According to various embodiments, the cooling device may be a cooling element. According to various embodiments, the at least one luminescent material may be thermally coupled to the cooling element. The optical element may be configured as integrating optical element, and may be arranged between the at least one excitation radiation source and the at least one luminescent material, so that at least a part of the radiation emitted from the at least one excitation radiation source and arriving in a range of accepted angles of the integrating optical device, may be subjected to at least one internal reflection in the integrated optical device, before it may exit the integrating optical element and may arrive at the at least one luminescent material, and so that at least a part of the radiation emitted from the at least one luminescent material enters the optical element and may exit the integrating optical element as useful radiation.

According to various embodiments, an effective cooling device may be provided by providing a cooling device as cooling element, wherein the at least one luminescent material may be thermally coupled to this cooling element. A cooling element may be a device for conducting of heat and releasing the heat to the environment by a material of high heat conductivity, by a liquid, by exploitation of a phase change or by electrothermal conversion. According to various embodiments, aluminum cooling elements, liquid coolers, Peltier elements or heat pipes may be used. By applying of the luminescent material on the cooling element, a good heat removal may be provided. This may allow for high light densities.

According to various embodiments, in a light source device, the luminescent element may be excited from one side, and the useful radiation may be emitted to the same side.

According to various embodiments, a high average light density (in other words: a high average brightness) may be provided, by providing sufficient cooling of the luminescent material, and by providing homogeneous excitation of the luminescent material.

According to various embodiments, the optical element may be configured as an integrating optical element, for example as an optical element, which may provide a mixing resp. homogenization of the radiation that enters the integrating optical element within an angle of acceptance. According to various embodiments, at least a part, for example at least 50%, of the radiation emitted from the at least one excitation radiation source arriving in a region of accepted angles of the integrating optical element, may be subject to at least one internal reflection, for example a plurality of internal reflections, in the integrating optical element, before it (in other words: this part) may exit the integrating optical element again and may arrive at the at least one luminescent material.

Thus, the difference between maximum and minimum excitation of the luminescent material, considered over the whole surface of the luminescent material, may be minimized. Thus, the luminescent material may be excited up to saturation.

According to various embodiments, at least a part of the radiation emitted from the at least one luminescent material may enter the integrating optical element and may exit the integrating optical element as useful radiation. By this twofold use of the integrating optical element, the cooling device may be configured as cooling element, for example as a non-transparent cooling element.

According to various embodiments, in the light source device, the at least one luminescent material may be operated evenly close to saturation over the whole surface of the luminescent material. Because the saturation effects may be avoided, the life time of the luminescent material may be increased. Furthermore, punctually high temperatures of the luminescent material, which could lead to decreased efficiency, may be avoided. Furthermore, undesired color dislocations caused by effects of temperature or radiation may be avoided.

According to various embodiments, a light source device and an optical system for coupling of fibers may be provided, and may for example be used in endoscopes or borescopes.

According to various embodiments, the integrating optical element may be configured so that at least a part of the radiation emitted from the at least one luminescent material and entering the integrating optical element may be subject to at least one internal reflection, before exiting the integrating optical element. This may be achieved by accordingly planning of the peripheries of the integrating optical element, which may be reflective, for example by a reflecting coating, for example by total reflection, as well for radiation from the excitation radiation source and for radiation emitted from the at least one luminescent material. Thus, the converted useful light resp. the scattered and reflected excitation light for optimal generation of white may be mixed and homogenized in the integrating optical element.

According to various embodiments, the cross section of the at least one integrating optical element may be not rotationally symmetric, but may include corners, and may be for example rectangular. Thus, a good mixing of the rays of the excitation radiation source may be provided, and this may lead to a very homogenous distribution of intensity of the excitation radiation on the surface of the luminescent material. According to various embodiments, this may be especially useful, in case the average optical excitation power density exceeds 2.5 W/mm$^2$. With this, by taking into account the Stokes shift and conversion efficiency of the luminescent material, optical power densities of the useful light of more than 1.6 W/mm$^2$ for white light and thus high light densities of more than 140 cd/mm$^2$ may be generated. Without suited homogenization, the excitation power density may punctually exceed these values by a multiple, thus leading the above discussed negative effects like saturation or damage of the luminescent material. Furthermore, color dislocation may be avoided by such a homogeneous illumination. Furthermore, by the homogenization of the excitation radiation, a higher conversion efficiency may be provided because the conversion efficiency is decreased overproportionally high with higher excitation power resp. higher temperature. An angular shape of the integrating optical element may provide that the target area may be well illuminated in a given aspect ratio of height and width, for example 16:9 or 4:4.

According to an embodiment, the integrating optical element may have a ratio of the entrance area for the excitation radiation to the exit area of 3 to 15, and the respective areas may show the same aspect ratio. Thus, half of the acceptance angle for the excitation source and half of the exit angle of the useful light may be between 15° and 60°.

According to various embodiments, an optical widening device, for example, a scattering element for fanning of the radiation of the at least one excitation radiation source in a pre-determined angle range, may be provided between the at least one excitation radiation source and the at least one integrating optical element. By use of the optical widening device, a good homogenization and mixing of the rays by the integrating optical element because of the thus possible multiple internal reflection in the integrating optical element may be provided.

According to various embodiments, the optical widening device may include a lens, a mirror, a holographic element, a disc partially scattering in an angle range, for example a light shaping diffuser (LSD), or a volume phase grid. According to various embodiments, a possibly small mirror may be used, so as to minimize its influence on the distribution of the useful light. According to various embodiments, a volume phase grid may be used, which may be strongly sensitive to wave length or angle. The radiation emitted from the luminescent material may be free from influence from the volume phase grid at appropriate layout. According to various embodiments, a disc partially scattering in the angle area, for example a light shaping diffuser (LSD), may be arranged directly on the mirror, which may be configured as a tilted mirror.

According to various embodiments, at least the surface of the at least one cooling element, to which the at least one luminescent material may be thermally coupled, may be reflective with a reflection factor of at least 0.5, for example at least 0.75, for example at least 0.85, for radiation of the excitation radiation source and/or for radiation emitted from the luminescent material by the radiation emitted from the excitation radiation source. This may take into account, that by excitation of the luminescent material, the converted radiation may be emitted into the complete solid angle. By such a reflecting configuration of the cooling element, a maximum of this radiation may be used as useful radiation. Thus, according to various embodiments, the thickness of the luminescent material may be reduced, which may allow a more efficient cooling.

According to various embodiments, for composition of light of a desired color non-converted parts of the excitation radiation may be desired, and the cooling element may be configured to be reflective for radiation of the excitation radiation source. According to various embodiments, the surface of the cooling element may be configured for a diffuse reflection. Thus, furthermore, an elongation of the optical path through the layer of the luminescent material may be provided, which may allow for a thinner layer of luminescent material. This may further enhance a light source device according to various embodiments from thermal points of view. In case no superposition of excitation radiation and converted radiation is desired, for example, in case the luminescent material is configured, so that it provides a maximum conversion of the excitation radiation, no reflective layer of the cooling element may be desired, but only a layer of luminescent material of sufficient thickness.

According to various embodiments, a light source device including at least two excitation radiation sources may be provided, wherein the light source device further may include an optical concentration device for concentration of the radiation emitted from the at least to excitation radiation sources. Thus, a higher power density may be provided, because the laser source may have a low etendue and thus may be focused and concentrated very well, and thus, laser light of a plurality of sources may be coupled in. According to various embodiments, the laser source may be arranged far apart, without the occurrence of relevant loss. This may lead to a simpler possibility of cooling of the laser sources. According to various embodiments, although the laser sources may be arranged apart from each other, a high amount of radiation may be concentrated on the comparatively low area of the at least one luminescent material, which may lead to a high density of useful radiation. According to various embodiments, the optical concentration device may include at least one lens, an optical system, or a fiber optic device.

According to an embodiment, the light source device may further include at least one mirror, wherein the at least one integrating optical element may be coupled between the luminescent material and the at least one mirror. By this mirror, the useful radiation may be provided in a sold angle, which may be different from the place from which the excitation radiation comes from. According to an embodiment, the at least one mirror may be a dichroic mirror, which may be transmissive for the radiation of the excitation radiation source, and may be reflective for radiation emitted from the at least one luminescent material at excitation by the at least one excitation radiation source. According to an embodiment, the mirror may be a dichroic mirror, which may be reflective for radiation of the excitation radiation source, and transmissive for radiation emitted from the at least one luminescent material at excitation by the at least one excitation radiation source.

According to various embodiments, instead of usage of a dichroic mirror, the side of mirror facing the at least one luminescent material may be reflective for radiation emitted from the at least one luminescent material at excitation by radiation emitted by the at least one excitation radiation source, wherein the mirror may have an aperture, for example an opening, for example a hole, for coupling of radiation of the excitation radiation source into the integrating optical element. According to various embodiments, the diameter of the aperture may be 0.5 to 2 mm, for example about 1 mm. As explained above, the mirror may be configured as a tilted mirror, which may be reflective for radiation of the excitation radiation source. According to various embodiments, such a mirror may be as small as possible, so that its influence to the useful radiation may remain negligible.

According to various embodiments, the integrating optical element may be immersively connected to the at least one luminescent material. This may mean that the connection between the integrating optical element and the luminescent material may be realized without air gap, or may be provided by use of a material with adapted refractive index. According to various embodiments, almost all of the excitation radiation exiting the optical element may be used for excitation of the luminescent material and the other way round, all of the useful radiation emitted from the luminescent material may, either with or without conversion, depending on the application, enter the integrating optical element and thus may be available for the application.

According to various embodiments, the light source device may include a first luminescent material and a second luminescent material, wherein the first luminescent material may be configured to, when excited by the at least one excitation radiation source, emit radiation in a first wave length range, wherein the second luminescent material may be configured to, when excited by the at least one excitation radiation source, emit radiation in a second wave length range, different from the first wave length range. For example, when using the light source device in applications of projection, this may allow the generation of colored images. Here, the first luminescent material and the second luminescent material may be provided on the cooling element, mixed with each other. By usage of according filtering devices in the optical path, both colors, although they come into existence spatially mixed, may be made available sequentially for subsequent application.

According to various embodiments, the first luminescent material and the second luminescent material may be provided spatially separated on the cooling element, for example in the shape of a texture of a chess board. According to various embodiments, the at least one cooling element may be movable mounted, wherein the light source device may further include a moving device for moving the at least one cooling element, so that depending on the movement of the at least one cooling element during a first period of time the first luminescent material and during a second period of time, the second luminescent material may be exposed to the radiation of the at least one excitation radiation source. Thus, by using a single excitation radiation source, light of different wavelengths may be sequentially generated, which may be useful especially for applications of projection. Here, the at least one cooling element may be rotatably mounted, whereby by rotation of the cooling element, different luminescent materials may be exposed to the excitation source. By a rotatable mounting of the cooling element, an additional cooling effect may be provided. According to various embodiments, the at least one cooling element may be mounted to be movable translatorily, which may lead to the same or similar effects. According to various embodiments, the translatory movement may be provided by a linear motor. According to various embodiments, the radiation of the excitation source may sequentially lead to spatially separated luminescent materials, for example by using of an optical system designed for this.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

Furthermore, the light source device may further include an optical system, which may be configured to guide the radiation of the excitation radiation source so that at a fixed cooling element, during a first duration of time, the first luminescent material, and during a second duration of time, the second luminescent material may be exposed to the radiation of the at least one excitation radiation source.

Embodiments and effects described with reference to a light source device, wherever possible, may be valid for a projector which may include such a light source device.

Figure 27:
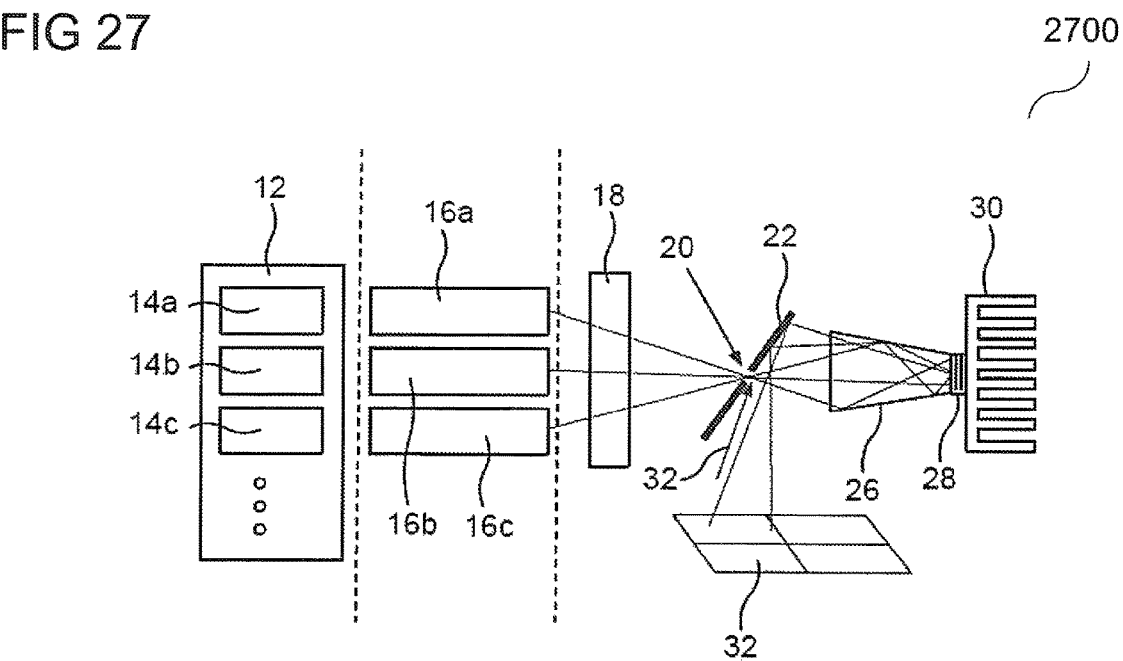
FIG. 27 shows a light source device in accordance with an embodiment.

FIG. 27 shows a view of a light source device 2700 in accordance with an embodiment. The light source device 2700 may include a laser array 12 with a plurality of laser sources 14a, 14b, 14c, each of which may include at least one laser diode. To each laser source 14a to 14c, an optical system 16a to 16c may be assigned, with which the angle distribution of the light emitted from the respective laser source 14a to 14c may be influenced, for example for focusing. In the optical path an optical concentration device 18 may follow, with which the light of the laser sources 14a to 14c may be focused on an aperture 20 in a dichroic mirror 22. The mirror may be tilted by a pre-determined angle against the optical path, for example by 45°. In the aperture 20, a diffusion disc 24 may be arranged, which may lead to a widening of the radiation passing the aperture 20. The diffusion disc 24 may for example be realized as a light shaping diffuser (LSD). The widened radiation may arrive in an integrating optical element 26, the end of which may be immersively coupled with a luminescent material 28, which may be thermally coupled to a cooling element 30.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

The integrating optical element 26 may have a maximum angle of acceptance. Radiation which arrives at a higher angle in the optical element 26 may not arrive at the luminescent material 28. The concentrating device 18 may be configured, so that the angular distribution of the radiation after passing the aperture 20 and the diffusing disc 24 may be lower or equal to the admissible input distribution of the integrating optical element 26. The integrating optical element 26 may be configured and arranged to the optical path of the radiation of the laser source, so that at least a part of the radiation emitted from the laser sources 14a to 14c, arriving in the range of acceptance of the integrating optical element 26, may be subjected to at least one inner reflection in the integrating optical element 26, before it may exit the optical element 26 again and may arrive at the at least one luminescent material 28. Thereby, a high homogenization and mixing of the radiation arriving at the luminescent material 28 may be provided.

According to various embodiments, the cross section of the at least one integrating optical element 26 may be not rotationally symmetric, but angular, for example rectangular.

The base area and the volume of the luminescent material 28 may be configured so that a conversion of radiation in the desired color of light may be possible. The volume may be optimized in regards of a minimum thermal resistance. The volume may be chosen taking into account the heat to be removed and the performance of the cooling element, so that the temperature in the luminescent material may be below 200° C.

According to various embodiments, the surface of the cooling element 30 may be reflective for excitation radiation, and thus the optical path length of the excitation radiation in the luminescent material 28 may be increased, because it may pass the luminescent material 28 twice, one time on the way to the reflection and one time on the way back after the reflection. Thereby, the volume of the luminescent material may be reduced, which may lead to a good thermal behavior.

According to various embodiments, by the integrating optical element 26, it may be provided that the intensity of the excitation radiation on the luminescent material 28 may be homogenously distributed and thus no local exaggerations (so called hot spots) of the intensity may occur, which would lead to degradation, over-saturation, and reduction of efficiency of the luminescent material 28. Furthermore, the thermal distribution and thus the efficiency of cooling may be enhanced.

According to various embodiments, by excitation of the luminescent material 28 by the excitation radiation which may be homogenized and adapted to the ground area of the luminescent material 28, the excitation radiation may be converted into radiation of desired color of light, depending on the configuration of the luminescent material 28 as combination of chemical compound and specificity of the volume, wherein the color of light may be identified by its spectrum respectively its intensity, and its location of color. The excited luminescent material 28 may emit the converted radiation in a Lambertian way, as explained above. According to various embodiments, by the reflective configuration of the cooling element 30, for example realized by a silvering between the cooling element 30 and the luminescent material 28, the converted radiation may be coupled into the output side of the integrating optical element 26 in a Lambertian way. The integrating optical element 26 may operate as an integrating collecting optics for the converted useful radiation, which now may arrive on the mirror 22 in the angular distribution determined by the integrating collecting optics, and may be directed by the mirror 22 to a homogeneously illuminated field 32 of output radiation.

According to various embodiments, with the light source device 10, a homogeneous excitation of the luminescent material 28 with high power density may be provided. With the above described homogenization, the complete volume of the luminescent material may be excited under high load, limited by cooling, saturation effects and swells of damage, and a highly efficient conversion may be provided. By this, a high measure of light density may be provided based on the principle of luminescent conversion of laser radiation.

According to various embodiments, the layer of the luminescent material may be provided to be thick enough, so that no reflective layer between the luminescent material 28 and the cooling element 30 may be desired. "Thick enough" may be a thickness of a layer, the transmissitivity of which is lower than 1%. The thickness required therefore may be about 100 µm or less. Such a layer may be thermally conductive, so that a heat removal to the cooling element 30 may not be obstructed. The ratio between absorbed excitation radiation and emitted conversion radiation may depend for such a layer only on the parameters of the material of the luminescent material 28, for example absorption and grit size.

According to various embodiments, instead of a collecting lens as an example of an optical concentration device 18, a fiber optics device may be provided, wherein the optical systems 16a, 16c each may be fiber couplers, and the optical concentration device 18 may be an optics to combine the fiber bundles.

According to various embodiments, three lasers sources 14a to 14c may be provided, wherein one of the laser sources may provide red light, and the other two sources may provide an excitation radiation with a wave length, which after conversion by the luminescent material 28 may result in blue resp. green light. The luminescent material 28 may be configured so that it does not convert red light. Therefore, in the useful radiation, spectral parts of the three colors red, green and blue may be present, which may be used sequentially by corresponding filtering, wherein the blue and the green spectral part may be obtained by reflection.

Figure 28:
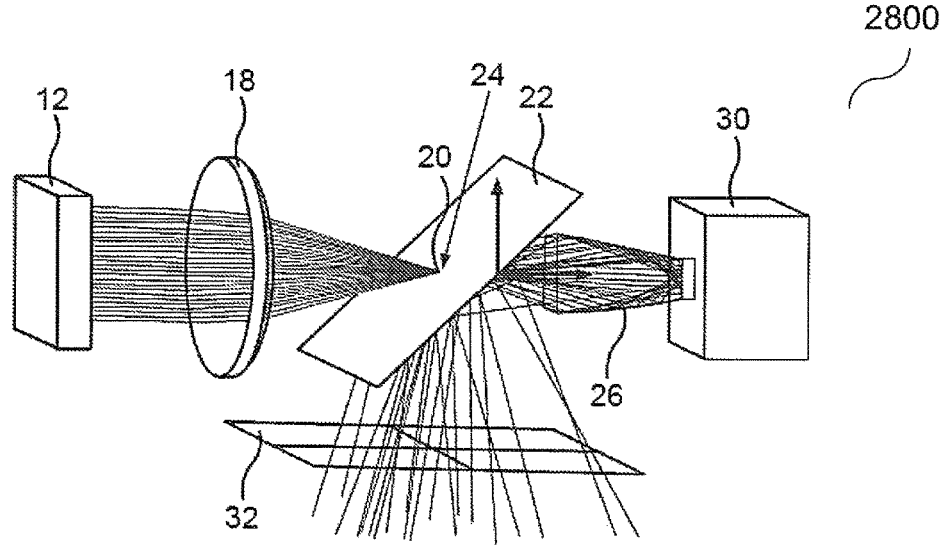
FIG. 28 shows a light source device in accordance with an embodiment.

FIG. 28 shows a view of a light source device 2800 in accordance with an embodiment, which is basically identical to the light source device 2700 of FIG. 27. In this view, it may be seen that the cross section of the integrating optical element 26 in this embodiment may be rectangular.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

Figure 29:
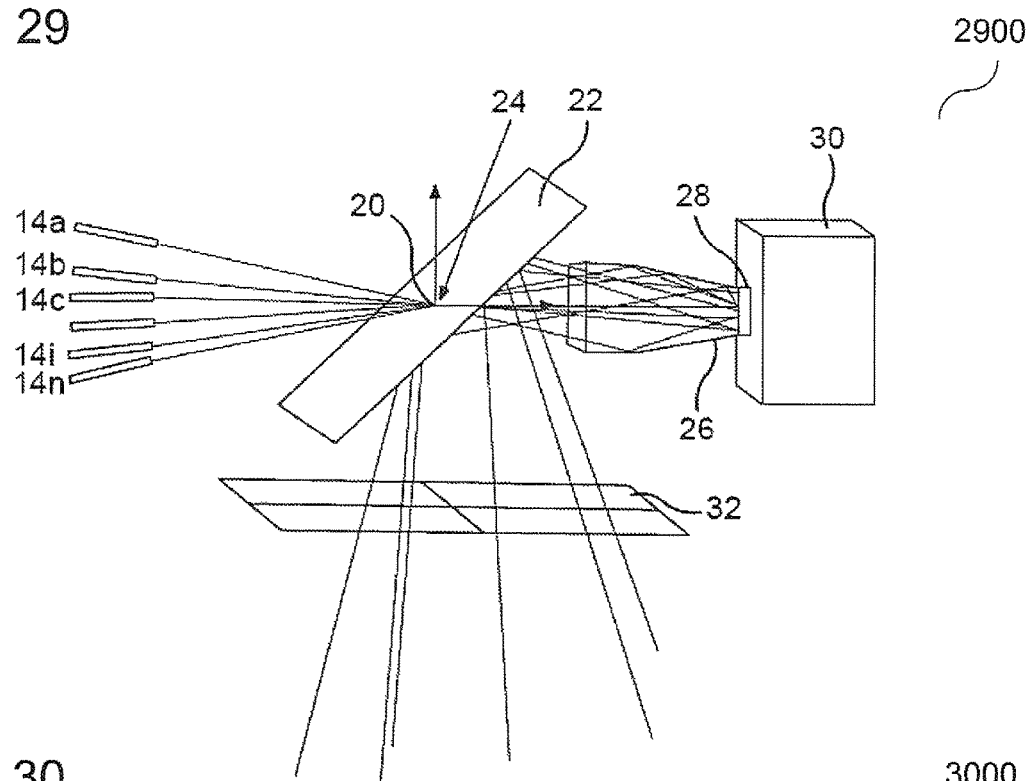
FIG. 29 shows a light source device in accordance with an embodiment.

FIG. 29 shows a light source device 2900 in accordance with an embodiment. In the light source device 2900, the laser sources 14a to 14n may be directed to the aperture 20 in the mirror 22, directly without a collecting optics. The maximum angle of arrival may be determined by the configuration of the integrating optical element 26.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

Figure 30:
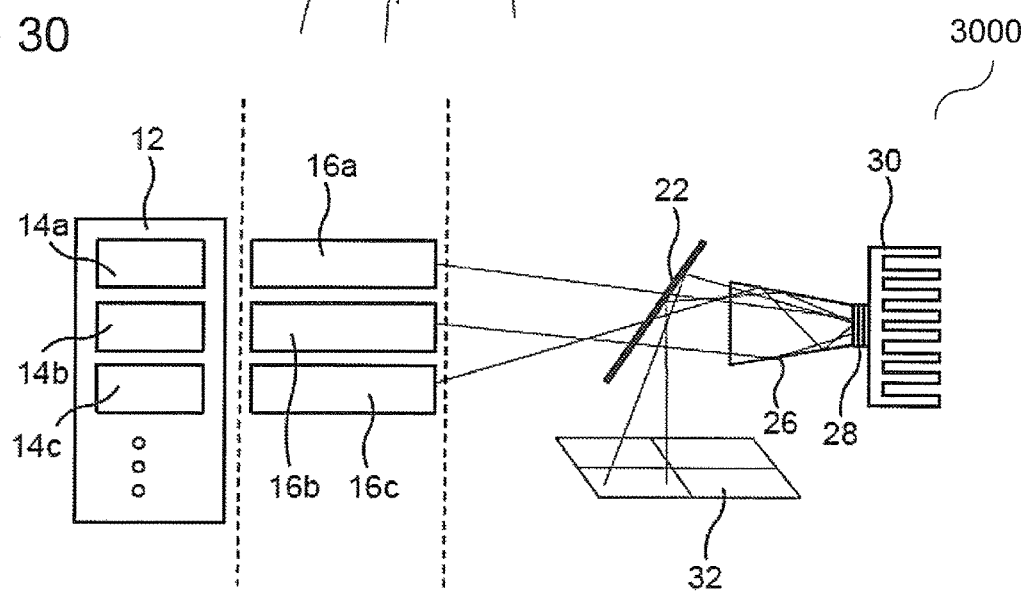
FIG. 30 shows a light source device in accordance with an embodiment.

FIG. 30 shows a light source device 3000 in accordance with an embodiment. In the light source device 3000, the mirror 22 may be configured as a dichroic mirror, which may be transmissive for radiation of the laser sources 14a to 14c, and may be reflective for converted radiation emitted from the luminescent material 28. As can been seen from FIG. 30, both a part of the excitation radiation and a part of the converted radiation may be subject to at least one inner reflection in the integrating optical element 26.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

Figure 31:
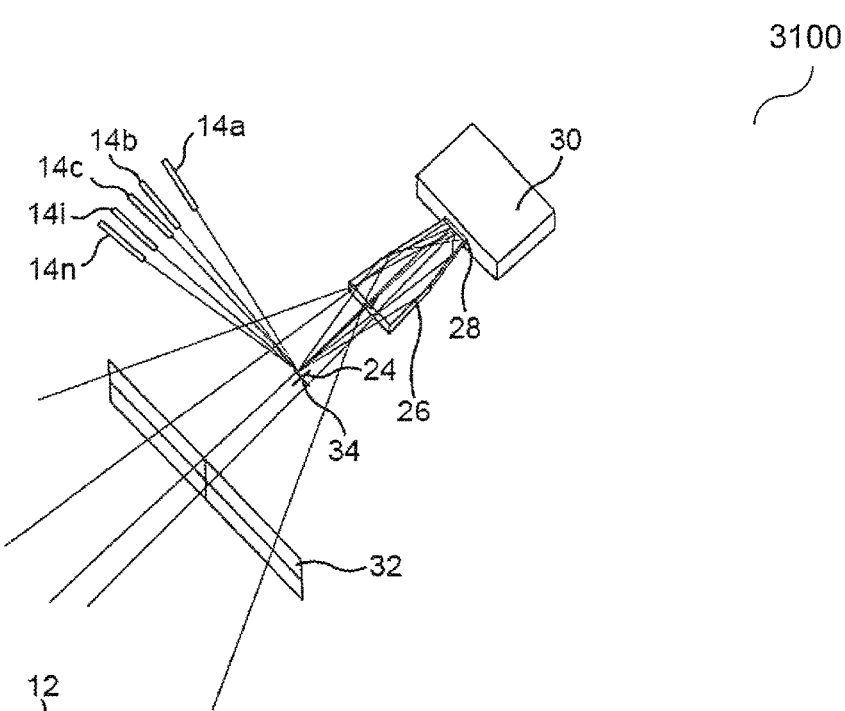
FIG. 31 shows a light source device in accordance with an embodiment.

FIG. 31 shows a light source device 3100 in accordance with an embodiment. The light source device 3100 may be provided without a mirror for the useful radiation. For coupling in the excitation radiation into the integrating optical element 26 under an admissible distribution of angles, a very small tilted mirror 34 may be provided, which may be curved. Like the aperture 20 as described in the embodiments above, the mirror 34 may have no noteworthy influence to the distribution of the useful radiation because of its size. According to various embodiments, by using a tilted mirror with very small dimensions, a high degree of focusability of the laser sources used for excitation may be provided. According to various embodiments, instead of the mirror 34, a holographic element or a volume phase grid may be used at this position. The volume phase grid may be highly wavelength selective and angle selective, so that the light converted by the luminescent material 28 may be almost not influenced.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

In the light source device 3100, a scattering device 24 may be provided directly on the tilted mirror 34, instead of the scattering disc 24 as a widening device. According to various embodiments, a scattering element 24 may provide Gaussian scattering in 5°. For the embodiment described with reference to FIG. 30 above, a scattering element 24 directly in front of the mirror 22 may be provided for widening of the optical path.

Figure 32:
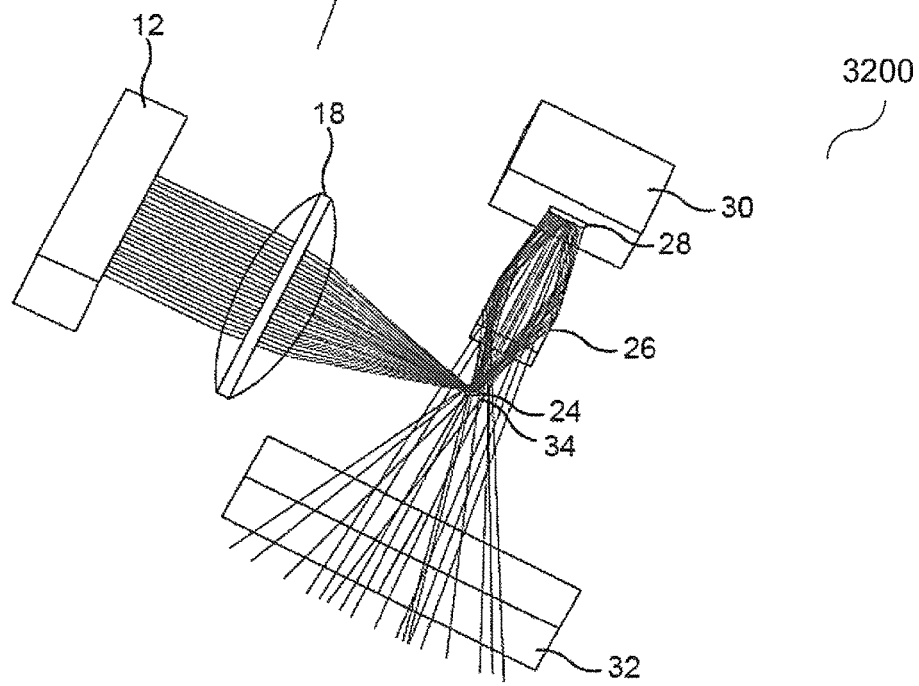
FIG. 32 shows a light source device in accordance with an embodiment.

FIG. 32 shows a light source device 3200 in accordance with an embodiment, wherein an array of laser diodes may be provided, wherein the radiation of the laser diodes may be focused to the tilted mirror 34 using a collecting optics.

According to various embodiments, the laser sources 14 may be arranged in a one-dimensional array 12, so that the cross section of the integrating optical element 26 is diagonally tilted with respect to the laser array.

According to various embodiments, a light source device according to one of the embodiments described above may be used in a projector or in a device for coupling of fibers, for example in an endoscope.

According to various embodiments, the luminescent material 28 may be provided on a disc or roll as explained above and below. In various embodiments, a cooling element 30 may not be desired, because by rotation of the disc or roll, cooling may be provided by the rotation. According to various embodiments, the cooling element 30 may be integrated into the disc or the roll.

According to various embodiments, the luminescent material 28 may be a rotating disc, which may have luminescent lateral surfaces.

According to various embodiments, wallwasher arrangements, as will be explained below, may be provided.

Figure 33:
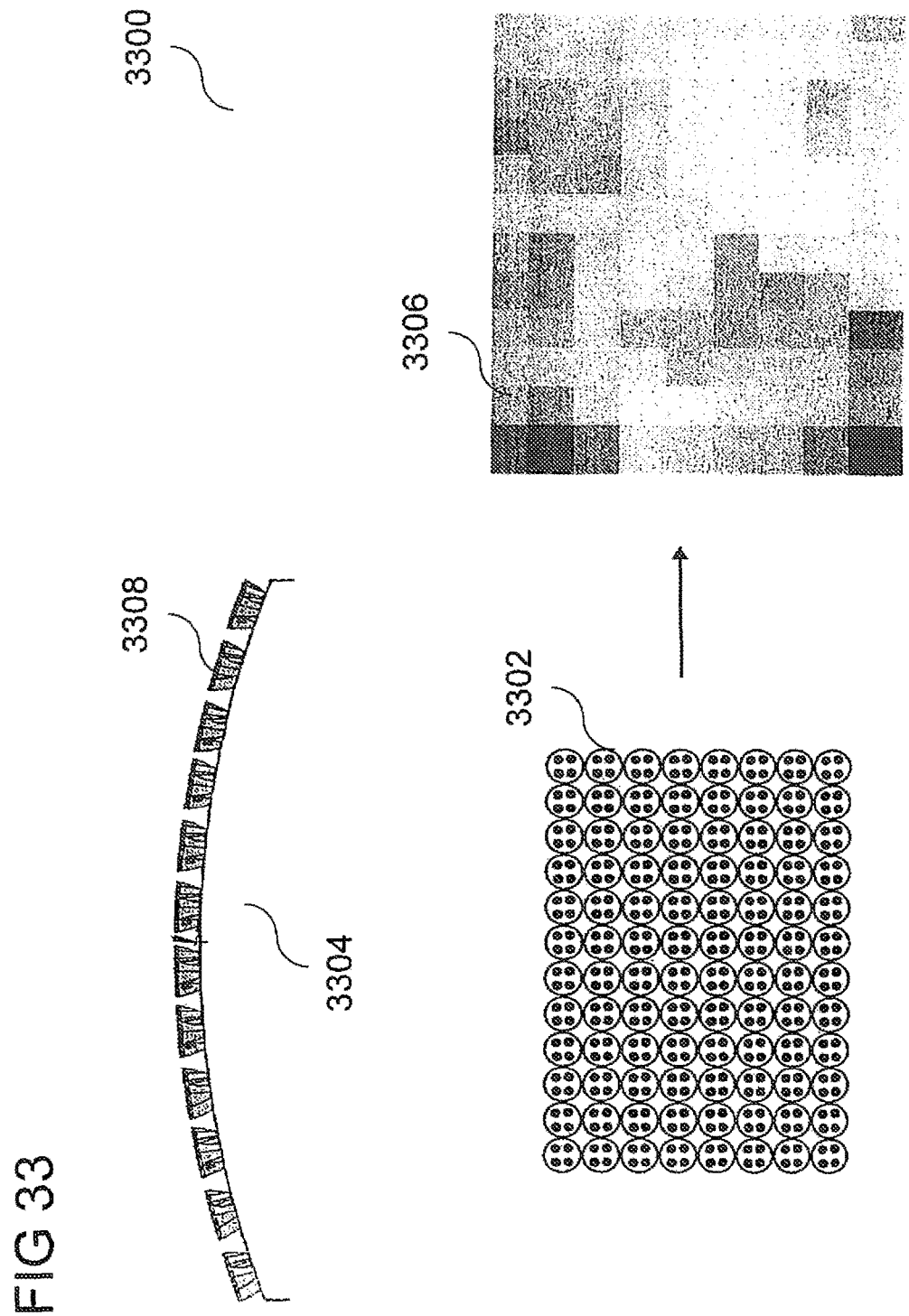
FIG. 33 shows an example of a wallwasher arrangement.

FIG. 33 shows an example of a wallwasher arrangement 3300. The wallwasher arrangement may include an array 3302 of illumination modules. A cross-section 3304 of the array is also shown. When the module is operating, it may illuminate for example a wall, and may produce colored effects 3306 on the wall. For example, the module may have a width of 708 mm, and each of the modules 3308 may have a width of 60 mm.

Figure 34:
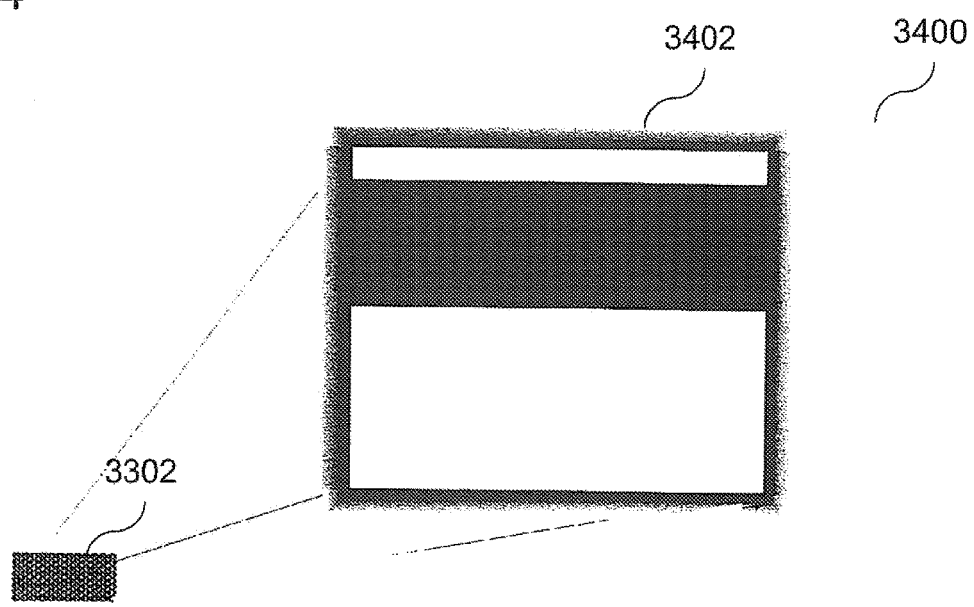
FIG. 34 shows an example of a wallwasher arrangement.

FIG. 34 shows an example of a wallwasher arrangement 3400. For example, the module array 3302 may be used to produce a washed video 3402 with a size of 6 m width, 3.5 m height in a distance of 6 m from the module array 3302.

According to various embodiments, wallwashers including a color roll and a laser source may be provided. Wallwashers may be used for effect lighting. Wallwashing applications may for example be the projection of washed color effects to large areas, like for example walls of rooms or buildings.

Figure 35:
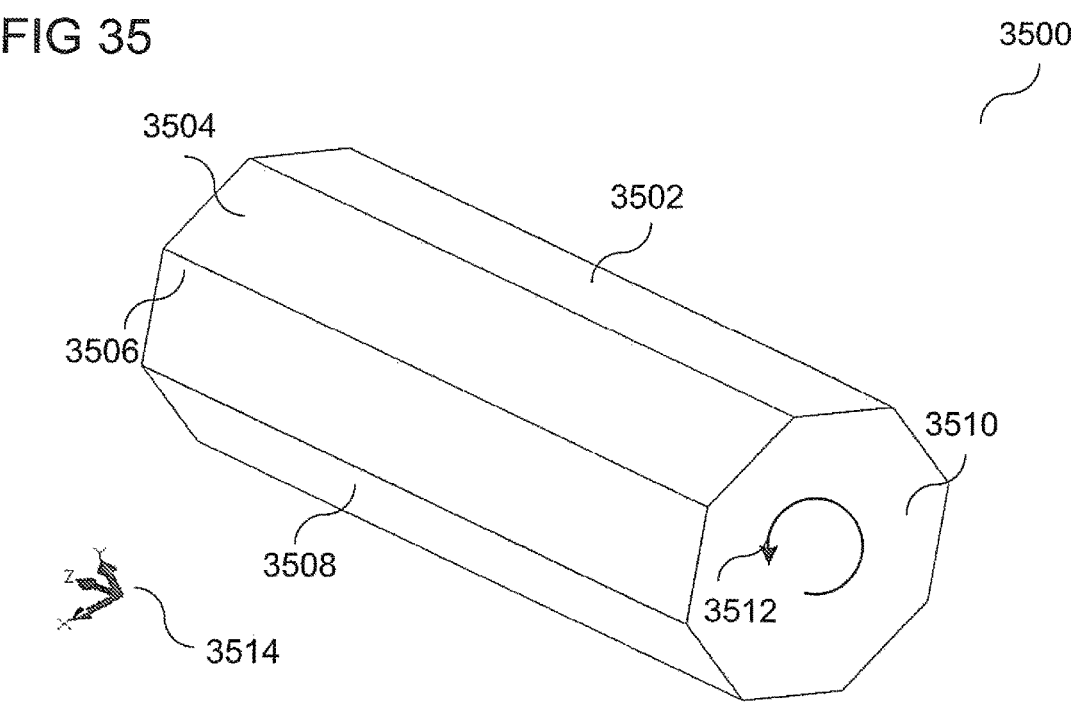
FIG. 35 shows a secondary light source in accordance with an embodiment.

FIG. 35 shows a secondary light source 3500 in accordance with an embodiment. The secondary light source 3500 may have the shape of a color roll, for example of a cylinder with a polygon as cross-sectional area. The cylinder may include a plurality of face, for example a first face 3502 of a first color (in other words: coated with a luminescent surface so that when excited, a first color is generated), a second face 3504 of a second color, a third face 3506 of a third color, and a fourth face 3508 of a fourth color. In case the cross-section is of octagonal shape like shown in FIG. 35, four further faces on the lateral side may be present and furthermore, a top face 3510 and a bottom face may be present. The secondary light source may be rotated along the longitudinal axis (for example perpendicular to the top face and to the bottom face), as indicated by arrow 3512. It will be understood that the secondary light source may have any polyhedral shape, for example including any cylinder with any polygon as cross-section. A coordinate system 3514 is also shown.

According to various embodiments, a rotating roll may be used as a secondary light source, which on its surface may have longitudinal stripes of different phosphor compounds.

Figure 36:
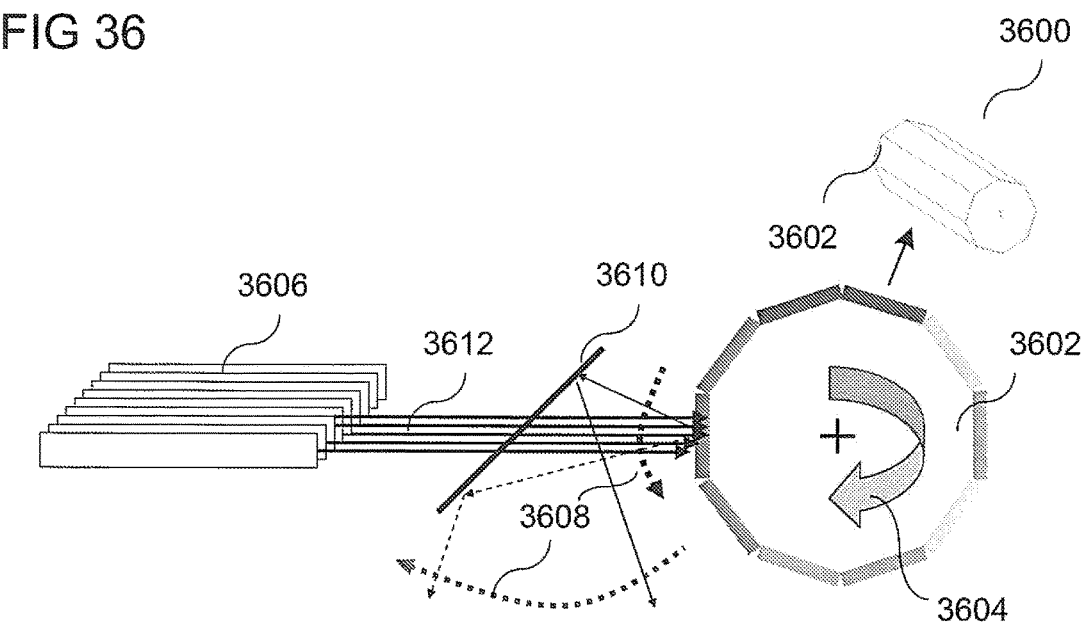
FIG. 36 shows a light source arrangement in accordance with an embodiment.

FIG. 36 shows a light source arrangement 3600 in accordance with an embodiment. The light source arrangement 3600 may include a rotating roll 3602 (as shown in cross-section and in a perspective view) with phosphor facets as explained above. The surface of the roll 3602 may be illuminated by a plurality of lasers 3606, which may be aligned next to each other. According to the angular position of the roll 3602, the light of the plurality of lasers 3606, for example blue laser light, may be converted into different colors. Thus, a complete color line may be projected onto a surface. The brightness of the single pixels may be adjusted by the power of the single laser modules. By rotation, as indicated by arrow 3604, of the roll 3602, this line of projection, which may also be referred to as flying colour bar, indicated by arrows 3608, may build up an image line by line. By rotation, with a single element, the different colors may be generated and the position of projection may continuously be changed.

The plurality of lasers 3606 may illuminate the rotating roll 3604 through a mirror 3610 as indicated by lines 3612. The mirror 3612 may have one or more holes or may be a dichroic mirror, so that the laser light may pass and the generated light may be reflected.

According to various embodiments, a three-dimensional body (not shown) may be provided. The three-dimensional body may be elongated in a longitudinal direction. The three-dimensional body may include a luminescent region of its surface, and an edge on its surface, wherein the edge may extend in the longitudinal direction.

The three-dimensional body may be used as a secondary light source according to various embodiments. For example, the three-dimensional body may be used instead of or in addition to a polyhedron, as explained above.

Furthermore, in a light source arrangement, the three-dimensional body may be rotated around an axis, wherein the axis may extend in the longitudinal direction.

For example, according to an embodiment, a roll, the surface of which is curved like an American Football may be provided, wherein the single cones of radiation may be faned out according to the radiation.

Figure 37:
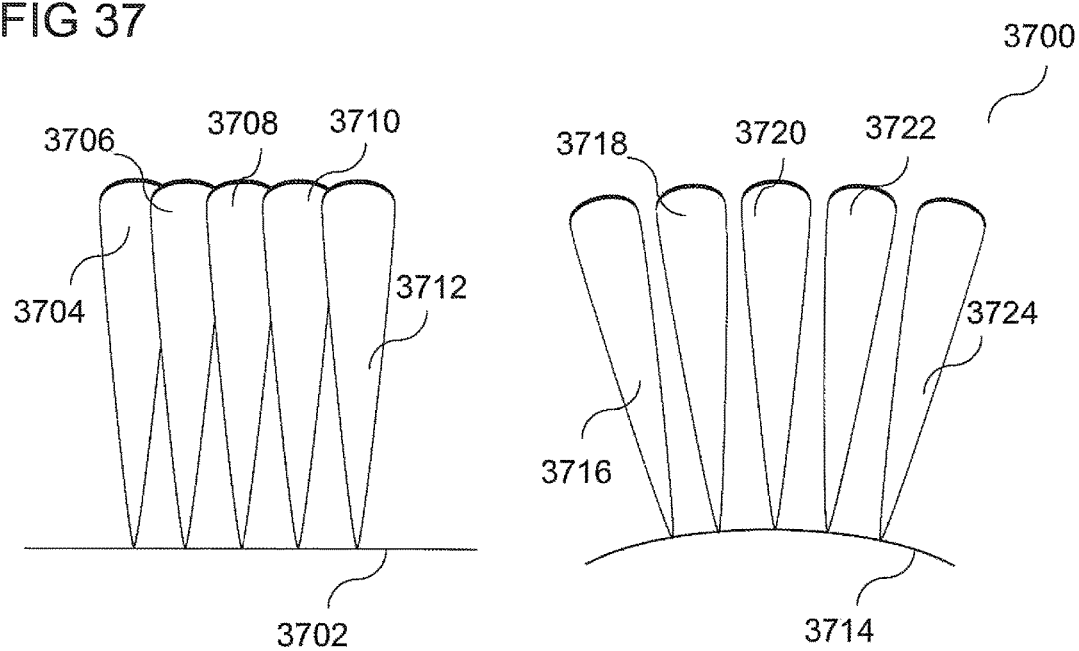
FIG. 37 shows example of light cones.

FIG. 37 shows examples 3700 of light cones. On a plain surface 3702, cones of light 3704 to 3712 may be not faned out, while on a curved surface, cones of light 3716 to 3724 may be faned out.

According to various embodiments, a further plurality of lasers may be provided, which may illuminate further segments.

According to various embodiments, wallwasher arrangements which may be compact respectively flat may be provided, because all elements may be arranged on basically one plane.

According to various embodiments, a wallwasher arrangement according to an embodiment may have a height of 10 cm to 100 cm (for example a height of 20 cm to 30 cm), a depth of 20 cm to 200 cm (for example a depth of 50 cm to 100 cm), a width of 20 cm to 500 cm (for example a width of 50 cm to 200 cm, wherein the values may depend for example on the projection area. According to various embodiments, a total luminous flux (in other words luminous power) of 10 000 lm (Lumen) to 30 000 lm (for example about 20 000 lm) may be provided.

The second dimension for the projection may be achieved by the rotational movement. By a suitable curvature of the surface, for example with a football shape, the cones of radiation may overlap less. This may increase the range of applicability, before effects of overlapping make a directed effect illumination difficult.

Figure 38:
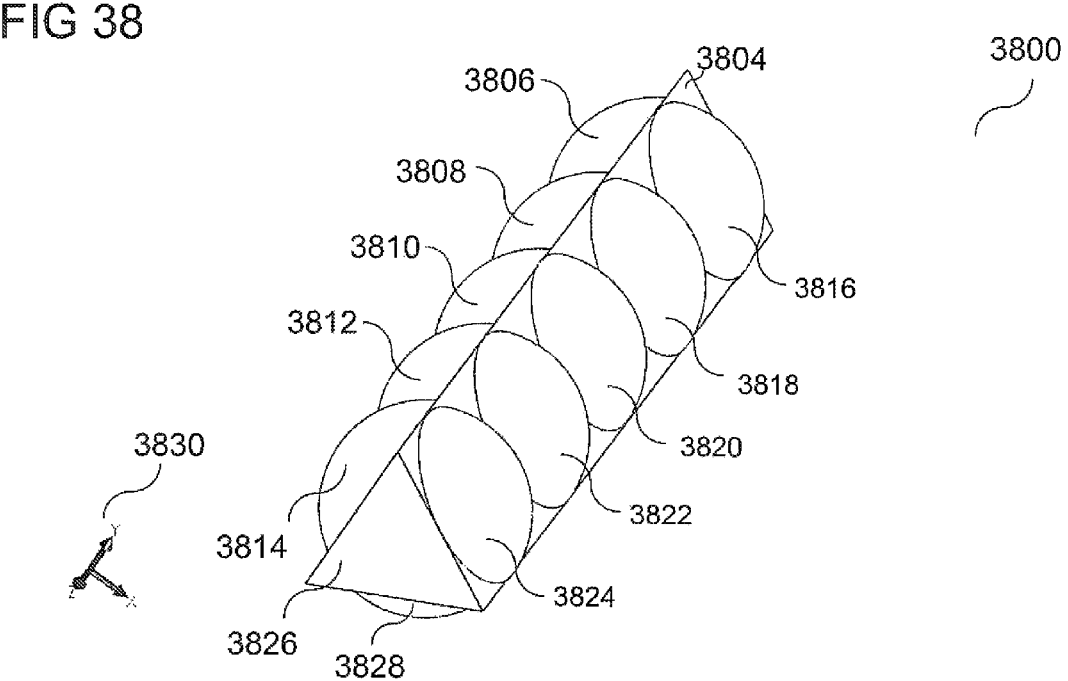
FIG. 38 shows a secondary light source in accordance with an embodiment.

FIG. 38 shows a perspective view of a secondary light source 3800 in accordance with an embodiment. The secondary light source 3800 may have the shape of a roll, with a first face (not shown) and a second face 3804. Further faces may be present. For example, in case the cross-section of the roll is a triangle, the faces on the lateral side and a bottom face and a top face 3826 may be present. Any one of the lateral sides may be luminescent, but does not need to be luminescent. The first face may be luminescent with a first color, and the second face 3804 may be luminescent with a second color. On the first face, a plurality of optical elements may be present, for example a first optical element 3806, a second optical element 3808, a third optical element 3810, a fourth optical element 3812, and a fifth optical element 3814, and on the second face 3804, a plurality of optical elements may be present, for example a sixth optical element 3816, a seventh optical element 3818, an eighth third optical element 3820, a ninth optical element 3822, and a tenth optical element 3824, as will be explained in more detail below. Optical elements may be provided on further surfaces. For example, on a third surface, an eleventh optical element 3828 may be provided. A coordinate system 3830 is also shown.

Figure 39:
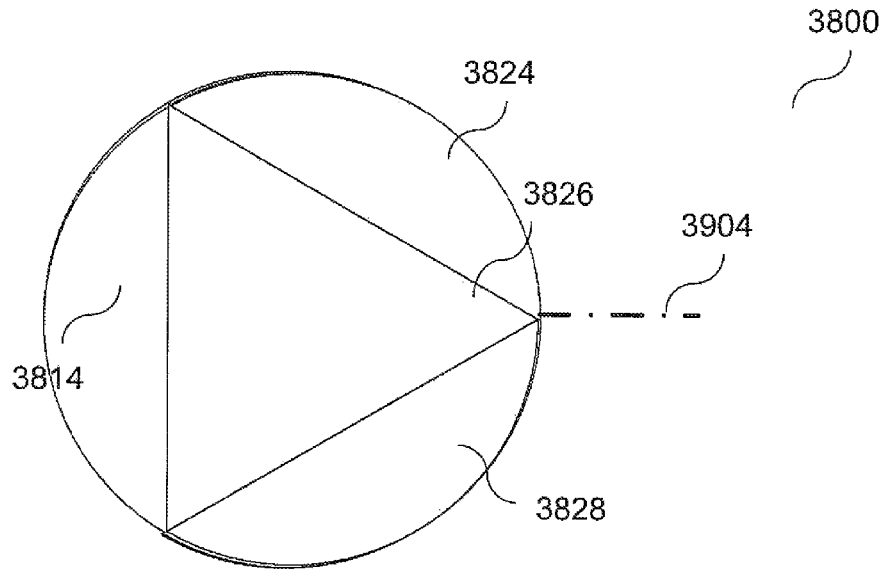
FIG. 39 shows a secondary light source in accordance with an embodiment.

FIG. 39 shows a top view of the secondary light source 3800 of FIG. 38 in accordance with an embodiment. A further optical element 3902 is shown. A line 3904 is also shown; the line 3904 may be a reference for the rotational angle, for example, the with a rotational angle of 0 degrees, the roll may be in the angular position as shown in FIG. 39.

Figure 40:
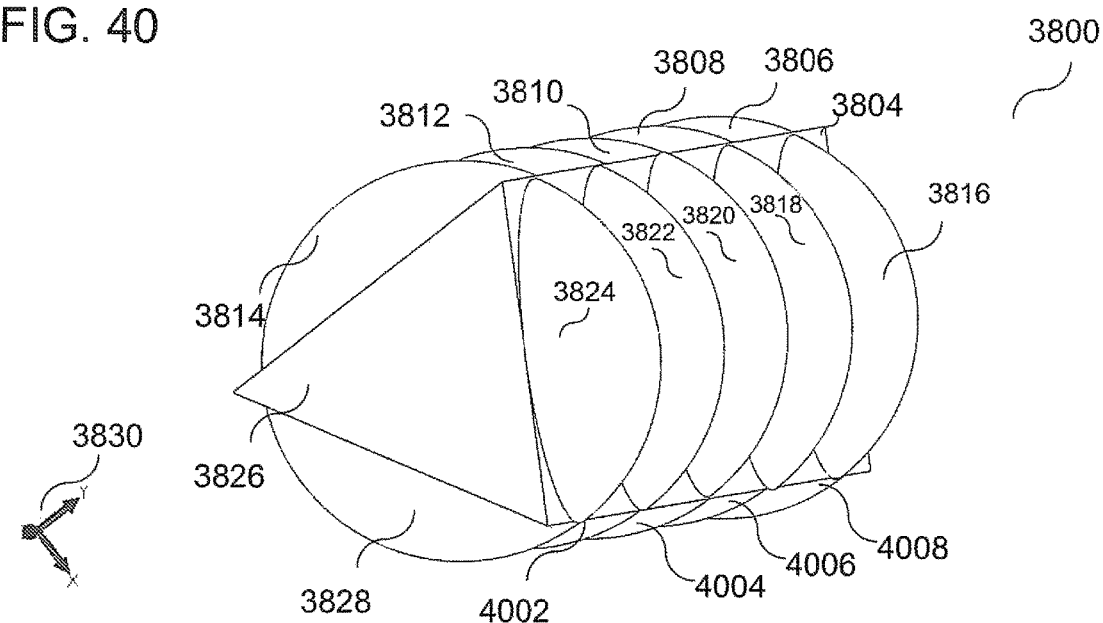
FIG. 40 shows a secondary light source in accordance with an embodiment.

FIG. 40 shows another perspective view of the secondary light source 3800 of FIG. 38 in accordance with an embodiment. Further optical elements 4002, 4004, 4006, and 4008 are shown.

Figure 41:
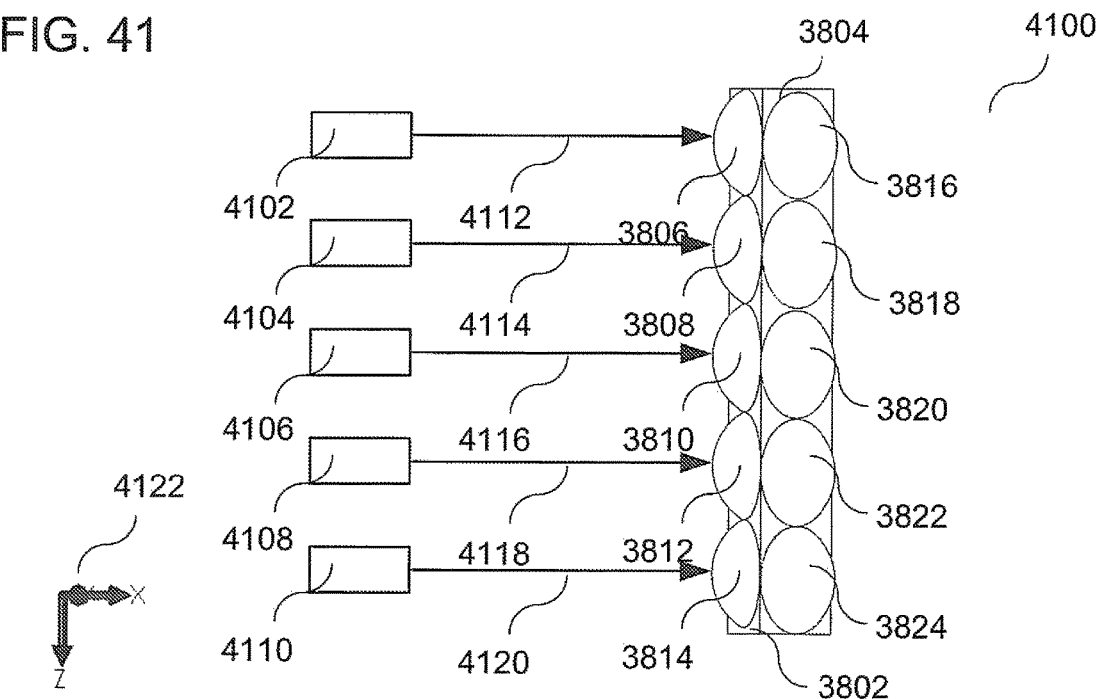
FIG. 41 shows a light source arrangement in accordance with an embodiment.

FIG. 41 shows a light source arrangement 4100 in accordance with an embodiment. The light source arrangement may include the secondary light source 3800 of FIG. 38. Furthermore, the light source arrangement may include a first laser 4102, a second laser 4104, a third laser 4106, a fourth laser 4108, and a fifth laser 4110. The light source arrangement 4100 may be used as a 5-column (corresponding to the five lasers and five optical elements on each face of the color roll) wall-washer. It will be understood that the number of columns is not limited to 5, but may be any natural number, for example. For each column, a laser illuminates a point on the roll through a corresponding optical element, as shown by corresponding arrows 4112 to 4120. A coordinate system 4122 is also shown.

In various embodiments, the optical elements may be lenses, for example cylinder lenses, for example stripe-shaped cylinder lenses.

Figure 42:
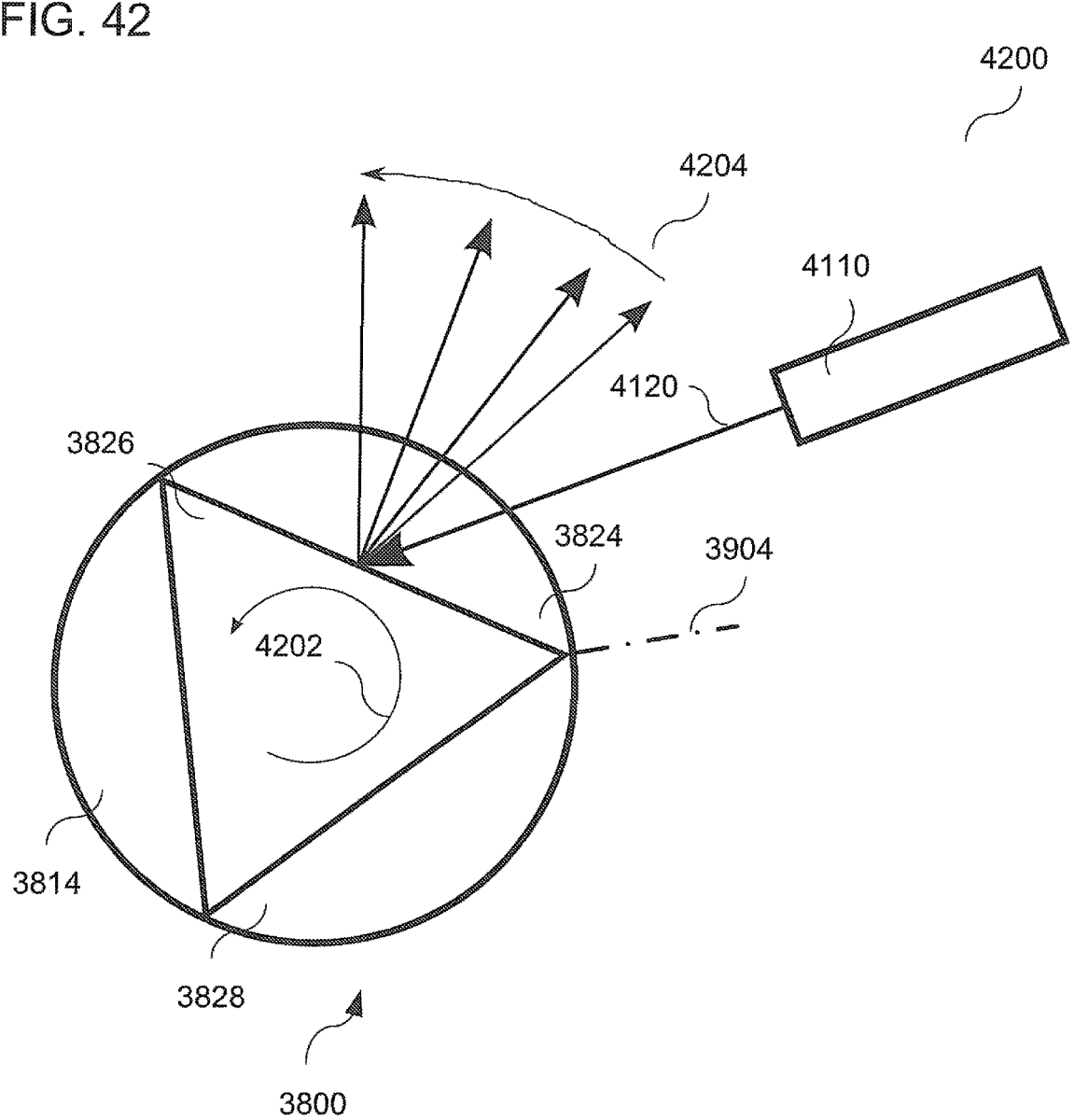
FIG. 42 shows a light source arrangement in accordance with an embodiment.

FIG. 42 shows a top view of the light source arrangement 4100 of FIG. 41 in accordance with an embodiment. The roll 3800 may be rotating as indicated by arrow 4202 including the lenses, for example cylinder lenses, for example stripe-shaped cylinder lenses. Thus, an emission spot that may rotate with the roll may be generated, as indicated by arrows 4204. In other words: the emission cone may rotate depending on the rotation angle of the roll.

Although a wallwasher with three segments (in other words: with three lateral faces) is shown, any number of segments may be used.

According to various embodiments, for a wallwasher, a low number of segments may be used, because then deviation (in other words: rotation of the emission cone) may be high.

In various embodiments, the color roll may be exchanged in the wallwasher, so that different kinds of effects may be received from the same wallwasher (but with different color rolls).

According to various embodiments, a high color rendering index (CRI) may be obtained.

According to various embodiments of color discs or color rolls, adjacent faces may have the colors red-greed-blue (RGB), red-green-green-blue (RGGB), X segments, or colors for a high CRI, wherein for various embodiments of RGB, RGGB, RGBG (red-green-blue-green), RGBCMY (red-green-blue-cyan-magenta-yellow) a plurality of colored areas may be provided. For example, RGBCMYRGBCMY (red-green-blue-cyan-magenta-yellow-red-green-blue-cyan-magenta-yellow or written in short 2×RGBCMY) or RGBRGB (red-green-blue-red-green-blue, or written in short: 2×RGB) may be provided on one disc or on one roll, so that for a given rotation speed, a rainbow effect (where for example color changes may be recognized) may be reduced. For example, a minimum of three areas may be provided. According to various embodiments, an upper limit for the number of areas may not exist.

According to various embodiments, not all lateral surfaces may be desired to be luminescent or a filter. There may be parts of the surface where no luminescent or filtering surface is present. There may be parts of the surface that are absorbent. There may be parts of the surface that are reflective.

According to various embodiments, various light sources or lighting devices or light source arrangements may be controlled by use of a DMX control interface, for example a DMX 512 interface.

According to various embodiments, secondary light sources may be exchangeable. For example, phosphor discs may be exchanged.

According to various embodiments, a high system efficiency may be obtained.

According to various embodiments, only little thermal energy may be produced, so that cooling may be easily performed.

According to various embodiments, low voltage may be applied, for example, no high voltages may be applied. Thus, no noise may be generated, and electromagnetic compatibility may be provided.

According to various embodiments, no turn-on time may be needed.

According to various embodiments, intensity may be easily adjusted.

According to various embodiments, no ultra-violet light may exit the light source arrangement.

According to various embodiments, no calibration of the light sources with respect to the optics may be needed.

According to various embodiments, no lamp may have to be exchanged.

According to various embodiments, sequences of colors to be generated may be programmed, and may be automatically be driven.

According to various embodiments, a large color gamut may be provided.

According to various embodiments, color changes may be provided quickly, and colors may be controlled for example in accordance with music for entertainment purposes.

According to various embodiments, adjustment for spot flood may be performed easily.

According to various embodiments, flashing strobe effects may be provided.

According to various embodiments, operation free from flickering may be provided, independent from the position of the rotation angle of the color roll.

According to various embodiment, dimming may be provided without a diffuser.

According to various embodiments, various beams may be aligned.

According to various embodiments, an excitation laser may reach the secondary light source perpendicular or almost perpendicular, but may also reach under an inclination angle. The laser may be of a point shape, circular shape, elliptic shape, a bar or a line, or any other shape.

By use of a DMD, a floodlight or spotlight may also be used as a projector.

According to various embodiments, only one uncoupling optics may be desired, because the segment of the wheel (in other words: disc) or roll may be rotating by the optics.

In various embodiments, a phosphor compound may be excited by ultra violet light, which may be not visible. This may also be referred to as "remote phosphor".

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light source arrangement, comprising:
   a primary light source and a secondary light source;
      wherein the primary light source is configured to illuminate the secondary light source;
      wherein the secondary light source comprises a polyhedron, the polyhedron comprising:
         a first luminescent face, and
         a second luminescent face; and
   a mechanized driver fixed to the primary light source.

2. The light source arrangement of claim 1,
   wherein the primary light source comprises at least one of a laser and a light-emitting diode.

3. The light source arrangement of claim 2,
   wherein the primary light source comprises at least one of a plurality of lasers and a plurality of light-emitting diodes.

4. The light source arrangement of claim 1, further comprising:
   a controller configured to control the primary light source and the driving mechanism, so that the primary light source is switched between an on state and an off state based on the state of the driving mechanism.

5. The light source arrangement of claim 1,
   wherein said primary light source comprises a plurality of light sources.

6. The light source arrangement of claim 5,
   wherein the polyhedron comprises a plurality of optical elements, each fixed to a face of the polyhedron; and
   wherein each light source of the plurality of the primary light sources is configured to illuminate at most one optical element of the plurality of optical elements at a time.

7. The light source arrangement of claim 1 wherein the polyhedron is configured so that the primary light source illuminates a plurality of luminescent faces of the polyhedron at a time.

8. A light source device, comprising:
   a primary light source;
   a secondary light source comprising a cylinder, wherein at least a part of the side area of the cylinder is luminescent;
   a mechanized driver fixed to the primary light source; and
   an integrating optical element;
   wherein the primary light source, the secondary light source and the integrating optical element are arranged so that light from the primary light source is internally reflected inside the integrating optical element before arriving at the secondary light source.

* * * * *